United States Patent [19]

Hamoda et al.

[11] Patent Number: 5,343,450
[45] Date of Patent: Aug. 30, 1994

[54] TIMER OPERATION MANAGEMENT APPARATUS

[75] Inventors: Keiji Hamoda, Fukaya; Jun Yoshikawa; Takeo Yamada, both of Kumagaya; Isamu Odane, Gunma; Masahiro Ito, Fukaya; Yoshimasa Noudan, Kumagaya; Hideo Kunii; Hirofumi Kanai, both of Fukaya; Masashi Yasuzato, Saitama, all of Japan

[73] Assignee: Kabushiki Kaisha Toshiba, Kawasaki, Japan

[21] Appl. No.: 843,744

[22] Filed: Feb. 28, 1992

[30] Foreign Application Priority Data

| Feb. 28, 1991 | [JP] | Japan | 3-034368 |
| Mar. 4, 1991 | [JP] | Japan | 3-060994 |
| Apr. 15, 1991 | [JP] | Japan | 3-111028 |
| May 1, 1991 | [JP] | Japan | 3-099940 |
| May 31, 1991 | [JP] | Japan | 3-129527 |

[51] Int. Cl.$^5$ .................. G11B 15/68; G11B 23/26
[52] U.S. Cl. .................. 369/19; 369/69; 369/92
[58] Field of Search .................. 360/61, 69, 71, 92; 369/19

[56] References Cited

U.S. PATENT DOCUMENTS

| 4,206,483 | 6/1980 | Nakamura | 360/33.1 |
| 4,991,040 | 2/1991 | Fukuda et al. | 360/92 |
| 5,032,937 | 7/1991 | Suzuki et al. | 360/73.06 |

FOREIGN PATENT DOCUMENTS

| 0310256 | 4/1989 | European Pat. Off. |
| 2030755 | 4/1980 | United Kingdom |

OTHER PUBLICATIONS

Patent Abstracts of Japan, vol. 6, No. 137 (P-130) Jul. 24, 1982, abstract of JP-A-57060563.

Primary Examiner—Tony M. Argenbright
Attorney, Agent, or Firm—Cushman, Darby & Cushman

[57] ABSTRACT

A timer operation management apparatus for managing the playback and recording of multiple video tape cassettes comprising cassette information storage capabilities for storing the presence/absence of cassette, the presence/absence of a safety lug, and the like; timer information capabilities capable of storing cassette designation information, start and stop time designations, record and play time designations, etc.; and wherein the cassette designation information includes both individual cassette designation information and all cassette designation information.

22 Claims, 26 Drawing Sheets

FIG. 2A

| MOUNT POSITION | PRESENCE/ABSENCE OF CASSETTE | RECORDING POSSIBLE/IMPOSSIBLE | REMAINING AMOUNT | SELECTION SETTING | TRACKING |
|---|---|---|---|---|---|
| A | PRESENT | POSSIBLE | | | |
| B | PRESENT | POSSIBLE | | | |
| C | PRESENT | POSSIBLE | | | |
| D | ABSENT | IMPOSSIBLE | | | |

FIG. 2B

| CASSETTE | PRESENCE/ABSENCE OF DESIGNATION | RECORDING/PLAY | RESERVATION TIME | REPETITION | SECOND RESERVATION TIME | THIRD |
|---|---|---|---|---|---|---|
| A | PRESENT | RECORDING | | | | |
| B | PRESENT | RECORDING | | | | |

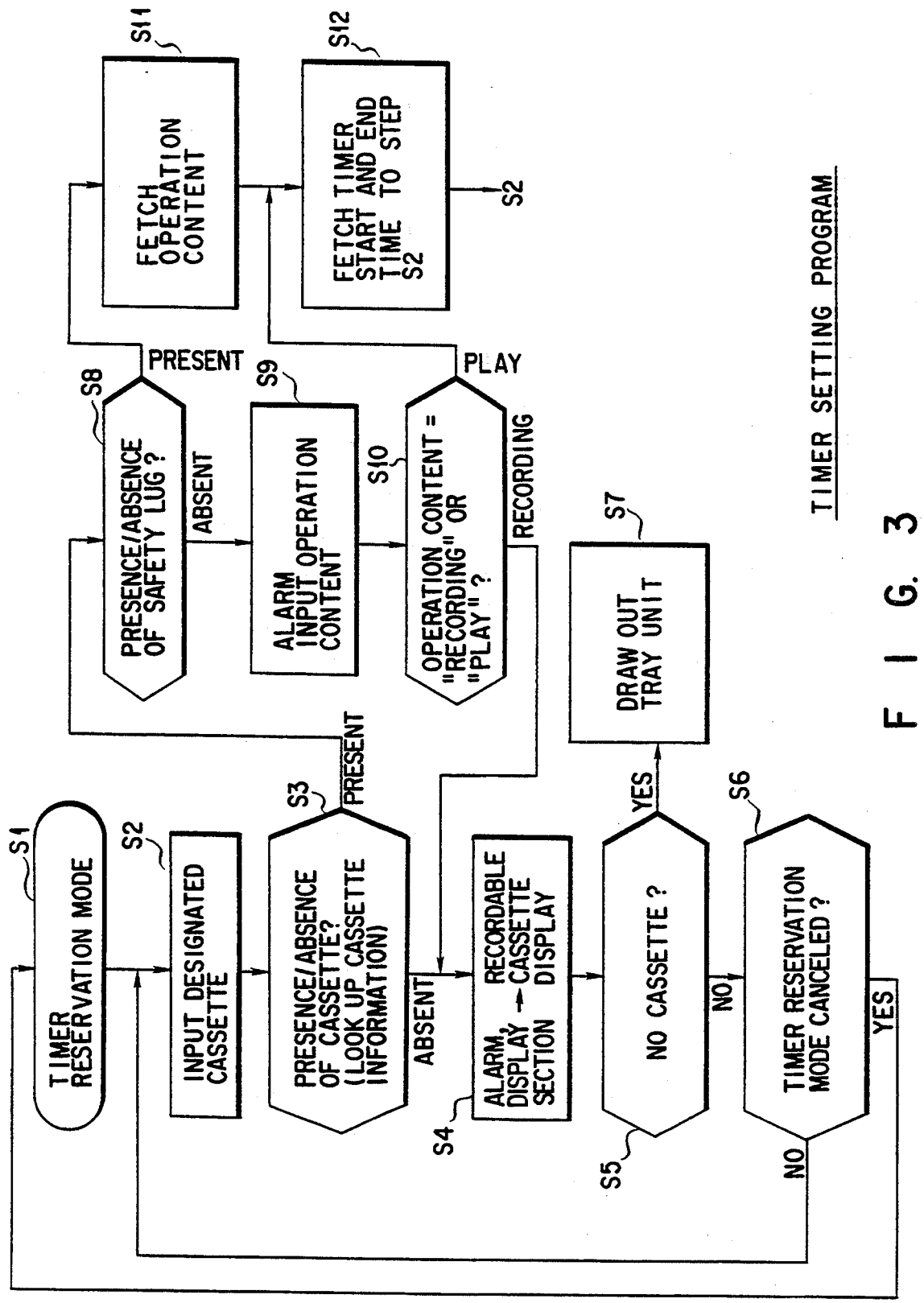
F I G. 3

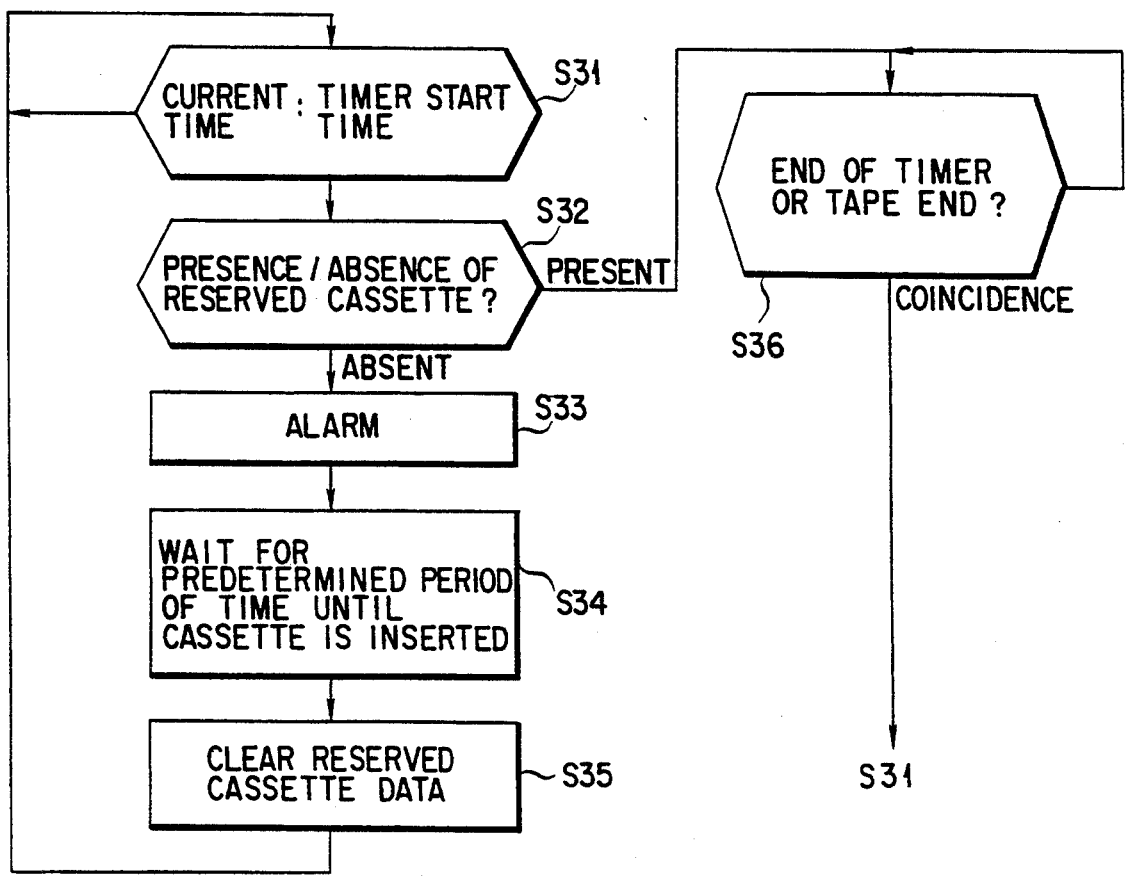
TIMER EXECUTION PLAY PROGRAM
F I G. 5

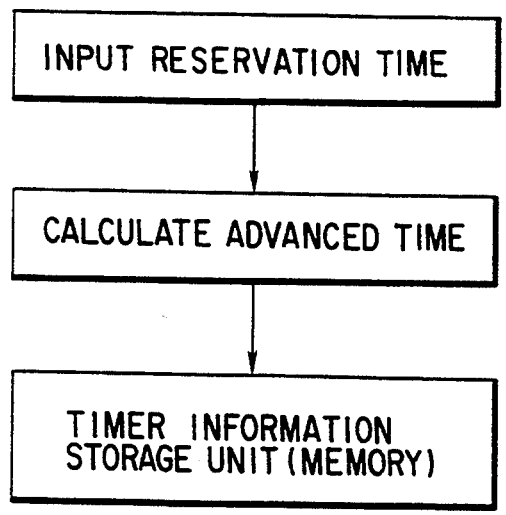
F I G. 6A
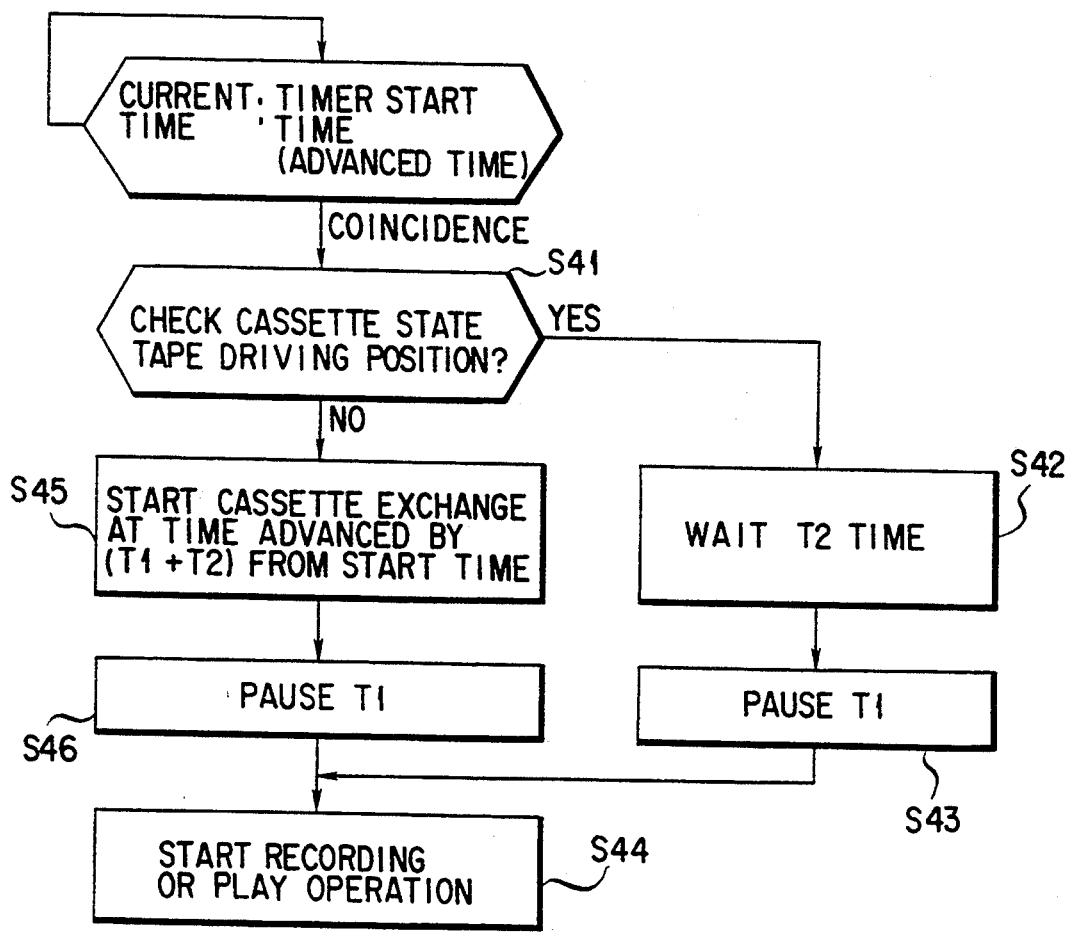
F I G. 6B

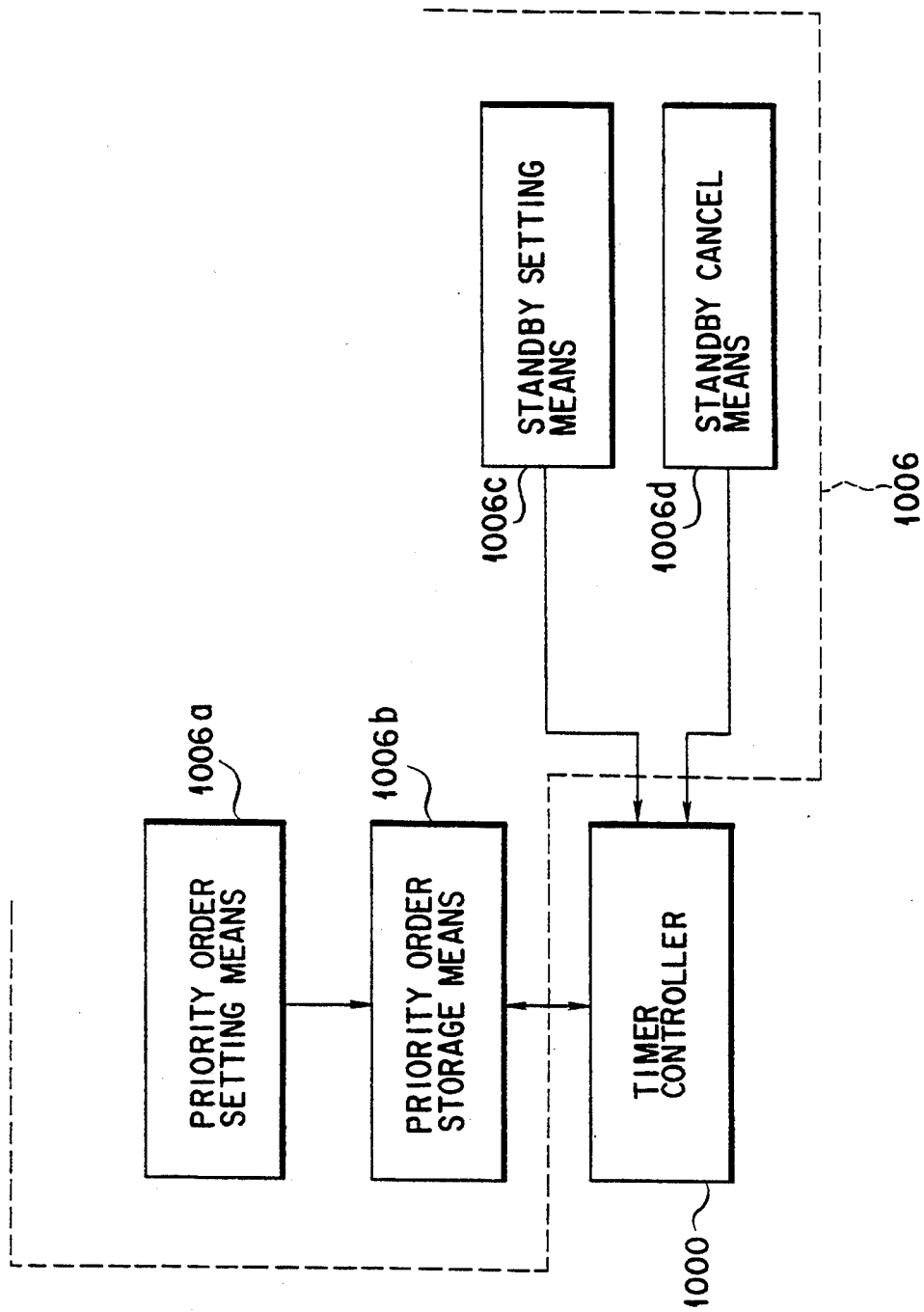

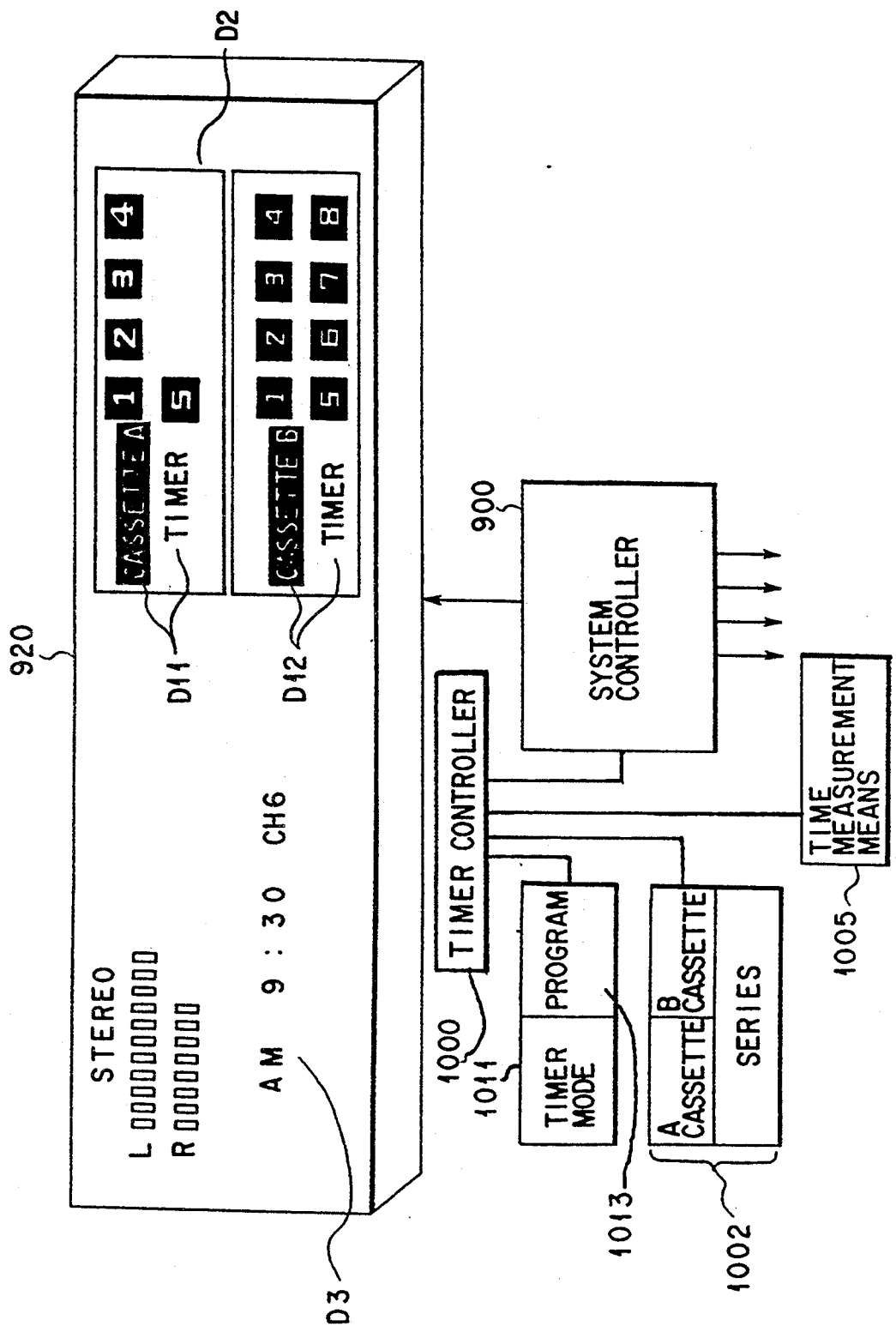

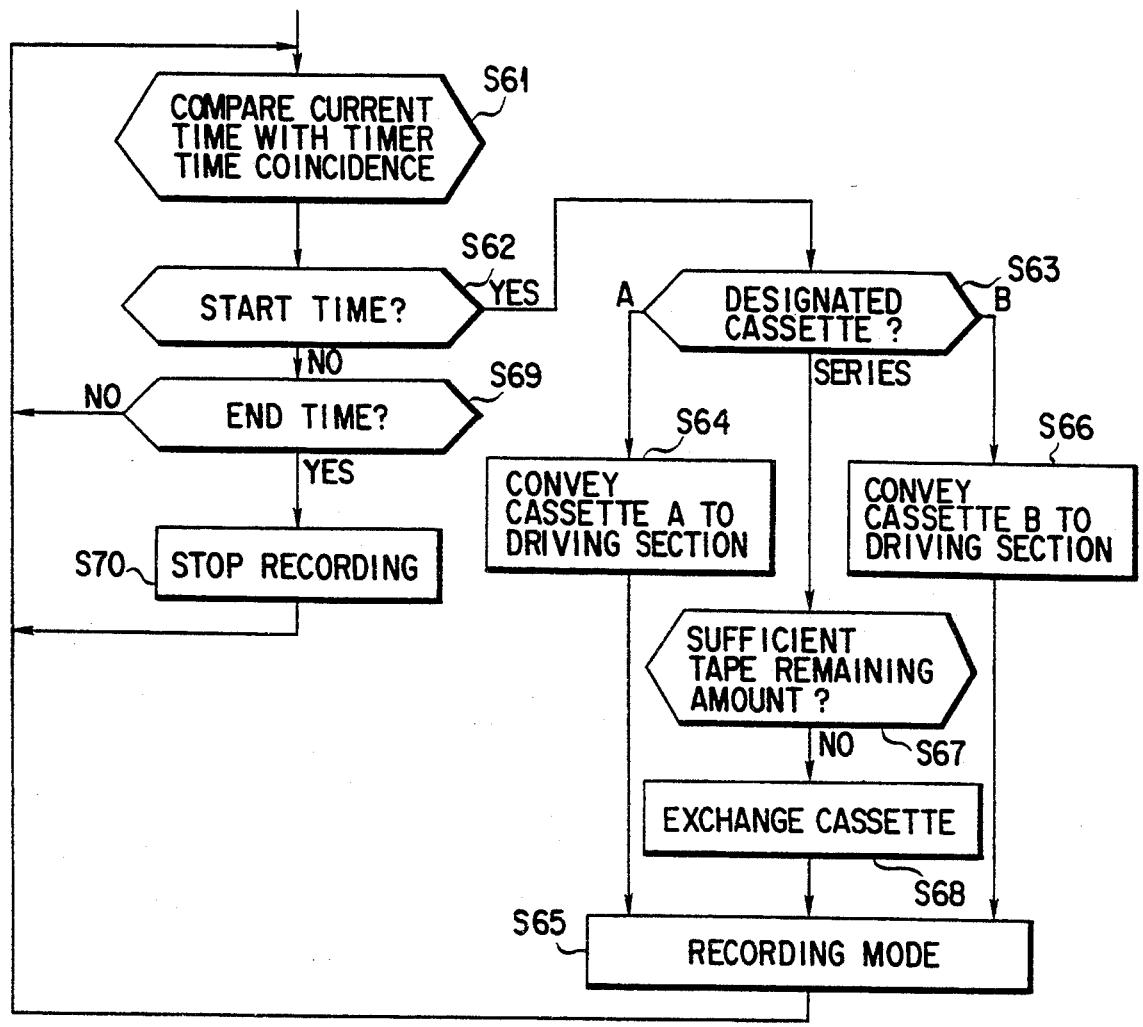
F I G. 11

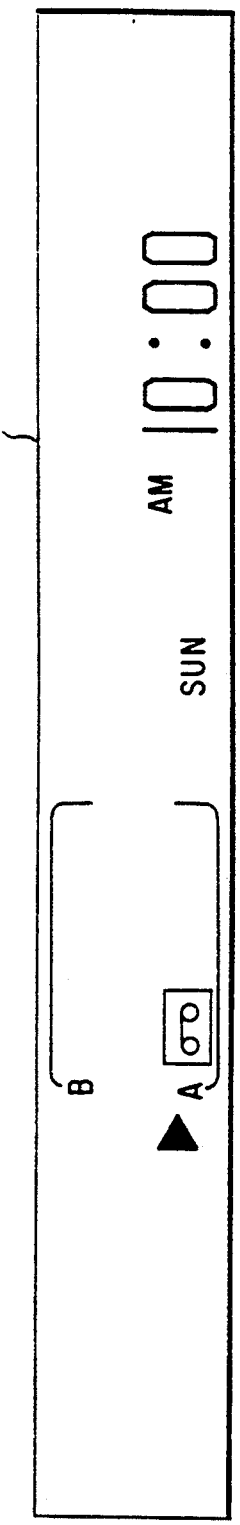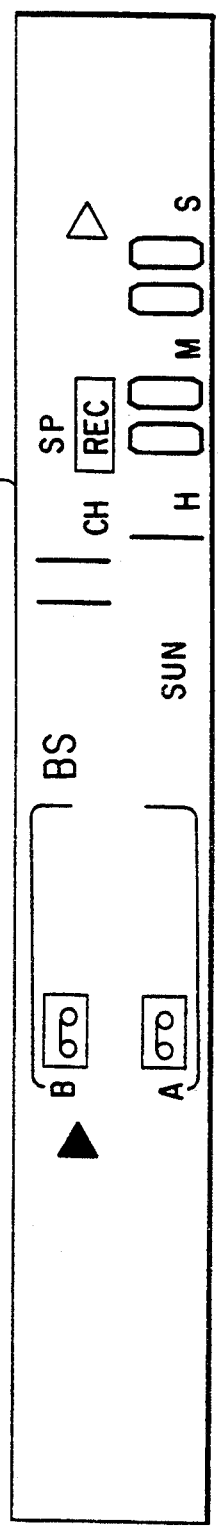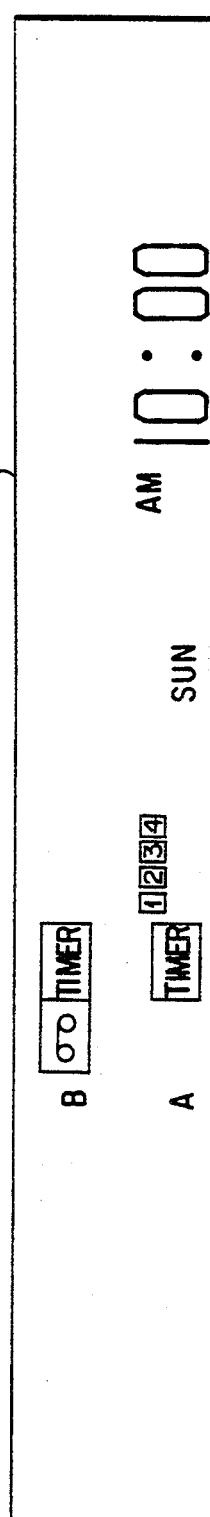

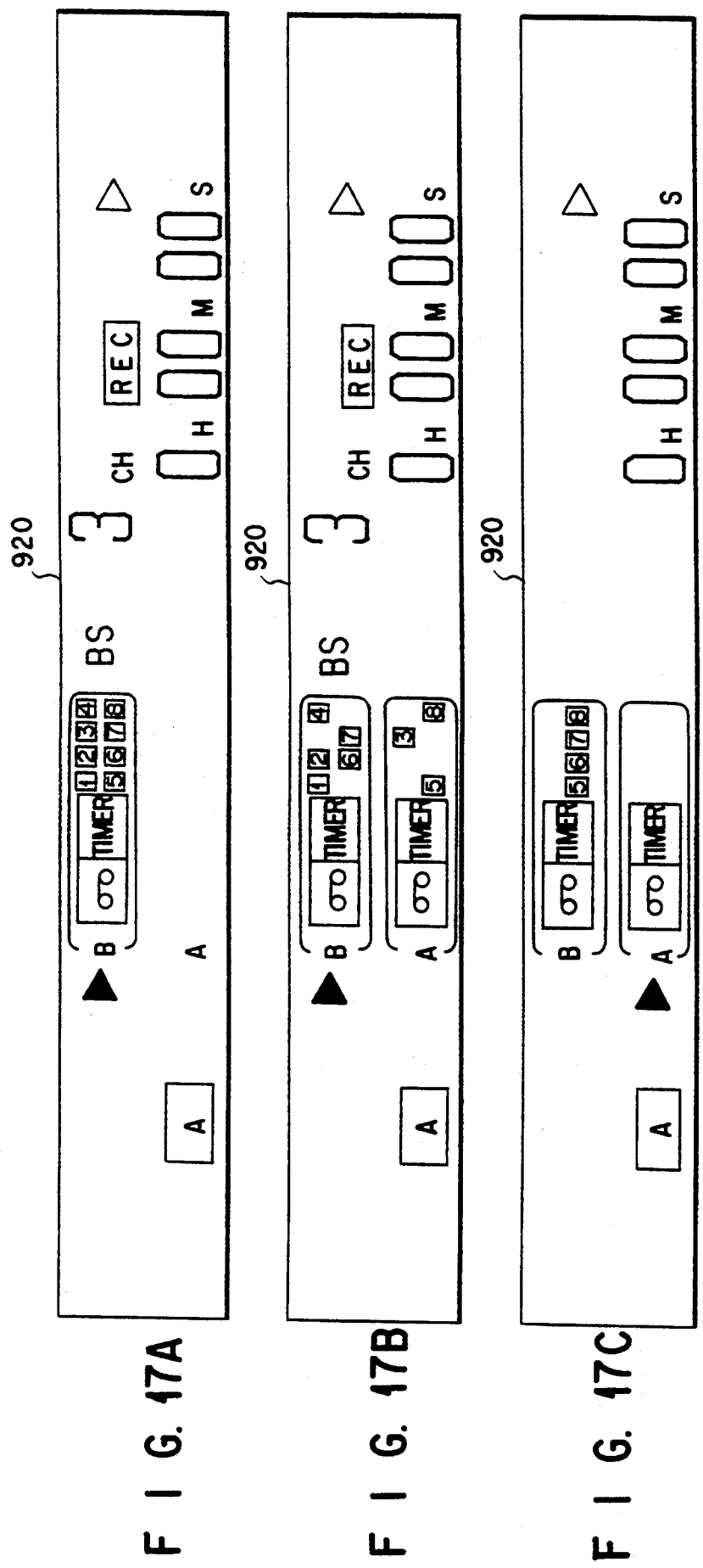

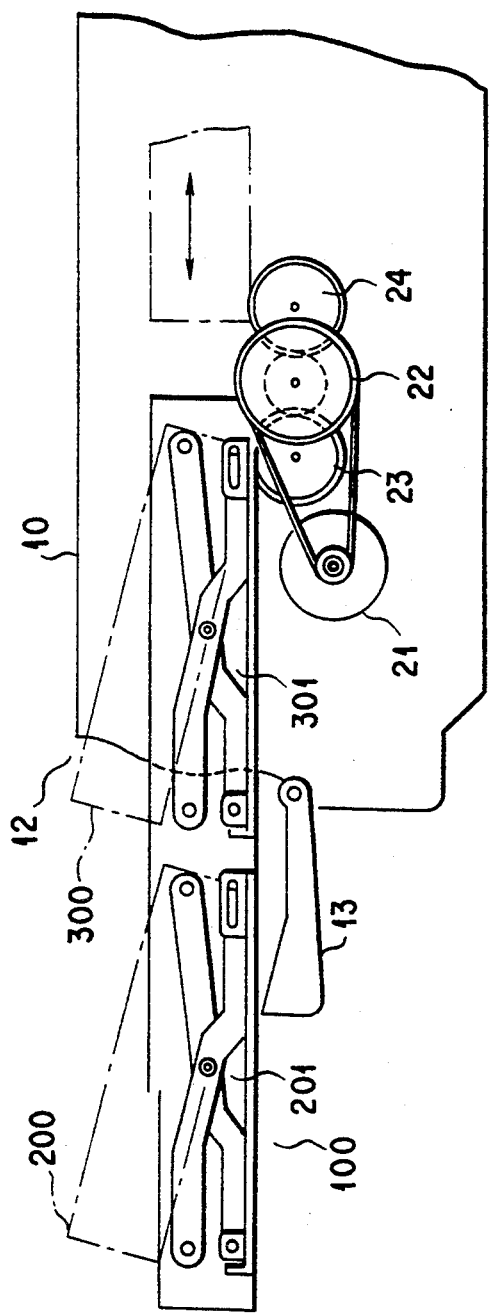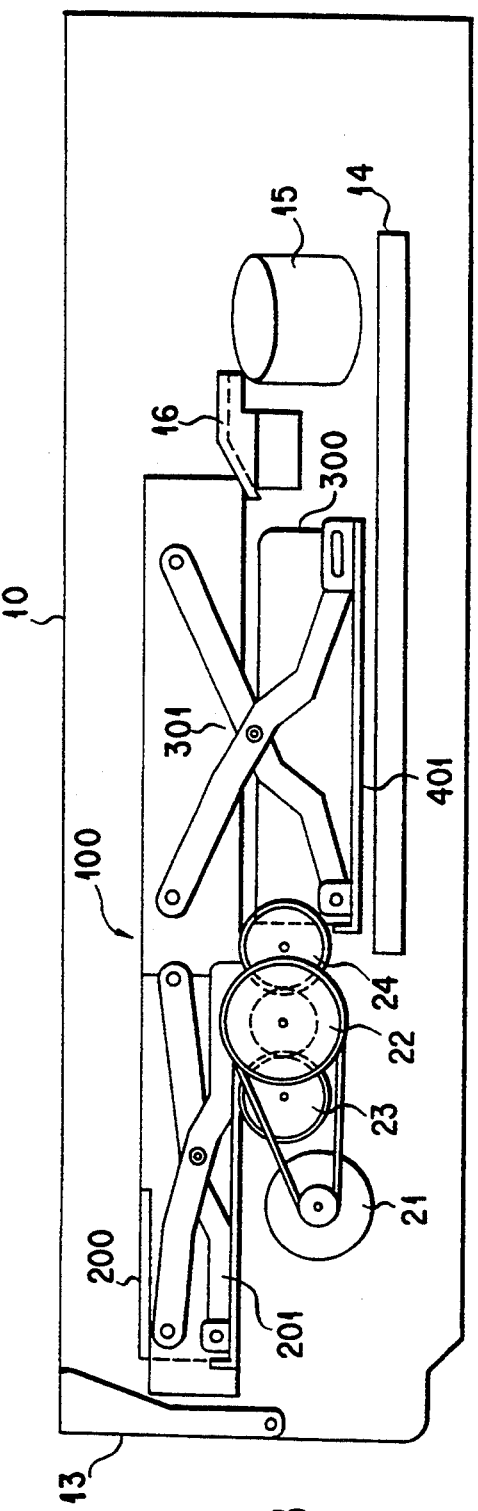
FIG. 18A
FIG. 18B

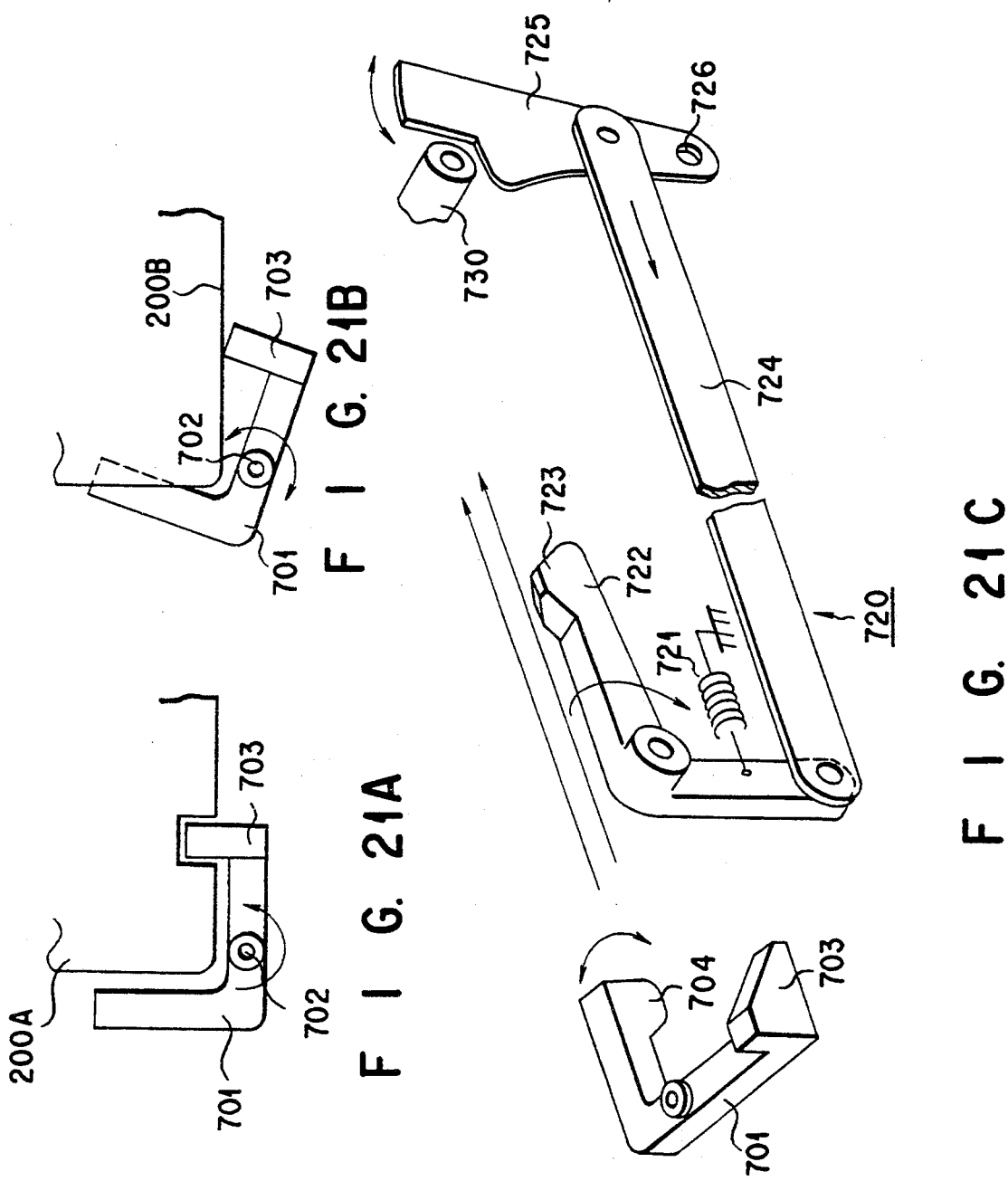

TIMER OPERATION MANAGEMENT APPARATUS

BACKGROUND OF THE INVENTION

1. Field of the Invention

The present invention relates to a timer operation management apparatus, assembled in, e.g., a video tape recorder (to be abbreviated to as a VTR hereinafter), a digital audio tape recorder (to be abbreviated to as a DAT hereinafter), and the like, having the function of automatically exchanging a plurality of cassettes and managing time of operations.

2. Description of the Related Art

In recent years, many television programs tend to be long. In addition, with the advent of satellite broadcast, programs broadcast around or after midnight are becoming increasingly popular. For this reason, VTRs tend to have a recording mode allowing a long-time recording operation during a user's absence.

However, since an existing VTR can load only one tape cassette, a long-time recording operation, or a recording capacity for an absent recording operation, is limited. Since the cassette size is standardized, limitations are imposed on the manufacture of large-capacity cassette tapes. In order to solve these problems, there are some proposals wherein VTRs are arranged to be able to load a plurality of cassettes.

When VTRs are arranged to be able to load a plurality of cassettes, however, various means for associating various functions of VTRs with a plurality of cassettes are required.

For example, when a timer recording operation is to be performed while a plurality of cassettes are set in a VTR, one of these cassettes must be selected when a recording start time is reached. When a timer recording reservation operation is to be performed, a cassette to be subjected to recording must be designated.

When the timer mode is canceled before a timer recording start time, and a VTR is left in this state, and the timer recording operation cannot be executed. In particular, when a plurality of users use a VTR capable of loading a plurality of cassettes, reliability of a timer operation is often impaired. For example, when a user A goes out after he or she sets a timer recording mode, a user B may use the VTR, and leave the timer mode canceled.

Furthermore, when a user performs a timer recording reservation operation, he or she must know whether or not the designated cassette exists in the VTR. In addition, a demand has arisen for a simple timer recording reservation operation.

SUMMARY OF THE INVENTION

It is, therefore, an object of the present invention to provide a timer operation management apparatus for, when a timer recording reservation operation is performed while a plurality of cassettes are loaded in a recorder, allowing a timer recording reservation mode for each arbitrary cassette, and also allowing a continuous timer recording reservation mode wherein a plurality of cassettes can operate as if they were a single cassette.

It is another object of the present invention to provide a timer operation management apparatus for, even when a plurality of cassettes are loaded in a recorder, reliably executing a timer recording reservation operation and a timer recording operation of a cassette, which is associated with a timer function.

In order to achieve the above objects, according to the present invention, there is provided a timer operation management apparatus comprising:

cassette information storage means for storing cassette information (e.g., presence/absence information of a plurality of cassettes, safety lug information of each cassette, and the like); and timer information input/storage means capable of inputting and storing timer information (cassette designation information of a cassette to be subjected to a timer reservation operation, operation content information indicating a recording or play operation during a timer operation, timing information indicating, e.g., a timer operation end timing, and the like), wherein the cassette designation information includes individual cassette designation information and simultaneous designation information for a plurality of cassettes.

According to the present invention, there is also provided a timer operation management apparatus comprising:

cassette information storage means for storing cassette information (e.g., presence/absence information of a plurality of cassettes, safety lug information of each cassette, and the like);

timer information input/storage means capable of inputting and storing timer information (cassette designation information of a cassette to be subjected to a timer reservation operation, operation content information indicating a recording or play operation during a timer operation, timing information indicating, e.g., a timer operation end timing, and the like); and judgment means for comparing the timer information and the cassette information during a timer reservation operation or at the beginning of execution of a timer operation after the reservation operation so as to judge whether or not the timer reservation operation or the timer operation can be executed for a designated cassette.

BRIEF DESCRIPTION OF THE DRAWINGS

FIGS. 2A and 2B are explanatory views showing tables formed in a cassette information storage unit and a timer information storage unit shown in FIG. 1;

FIG. 3 is a flow chart showing a timer operation reservation program utilized in a system of the present invention;

FIG. 5 is a flow chart showing a timer execution play program utilized in the system of the present invention;

FIG. 6A is a flow chart showing a timer time setting program utilized in the system of the present invention;

FIG. 6B is a flow chart showing a timer operation preparation program utilized in the system of the present invention;

FIG. 6C is a block diagram showing a timer cancel function;

FIG. 9 is an explanatory view showing an operation unit and another display section of a timer operation management apparatus according to still another embodiment of the present invention;

FIG. 11 is a flow chart showing a timer execution program utilized in the timer operation management apparatus according to the present invention;

FIGS. 15A to 15E, FIGS. 16A to 16D, and FIGS. 17A to 17C are explanatory views showing display examples of display units;

FIGS. 18A, 18B, and 18C are explanatory views showing the structure of a VTR, adopting the present invention, together with an operation mode in principle;

FIGS. 21A to 21C are explanatory views for explaining the operation of the safety lug detecting unit.

DETAILED DESCRIPTION OF THE PREFERRED EMBODIMENTS

The preferred embodiments of the present invention will be described hereinafter with reference to the accompanying drawings.

Figure 1:
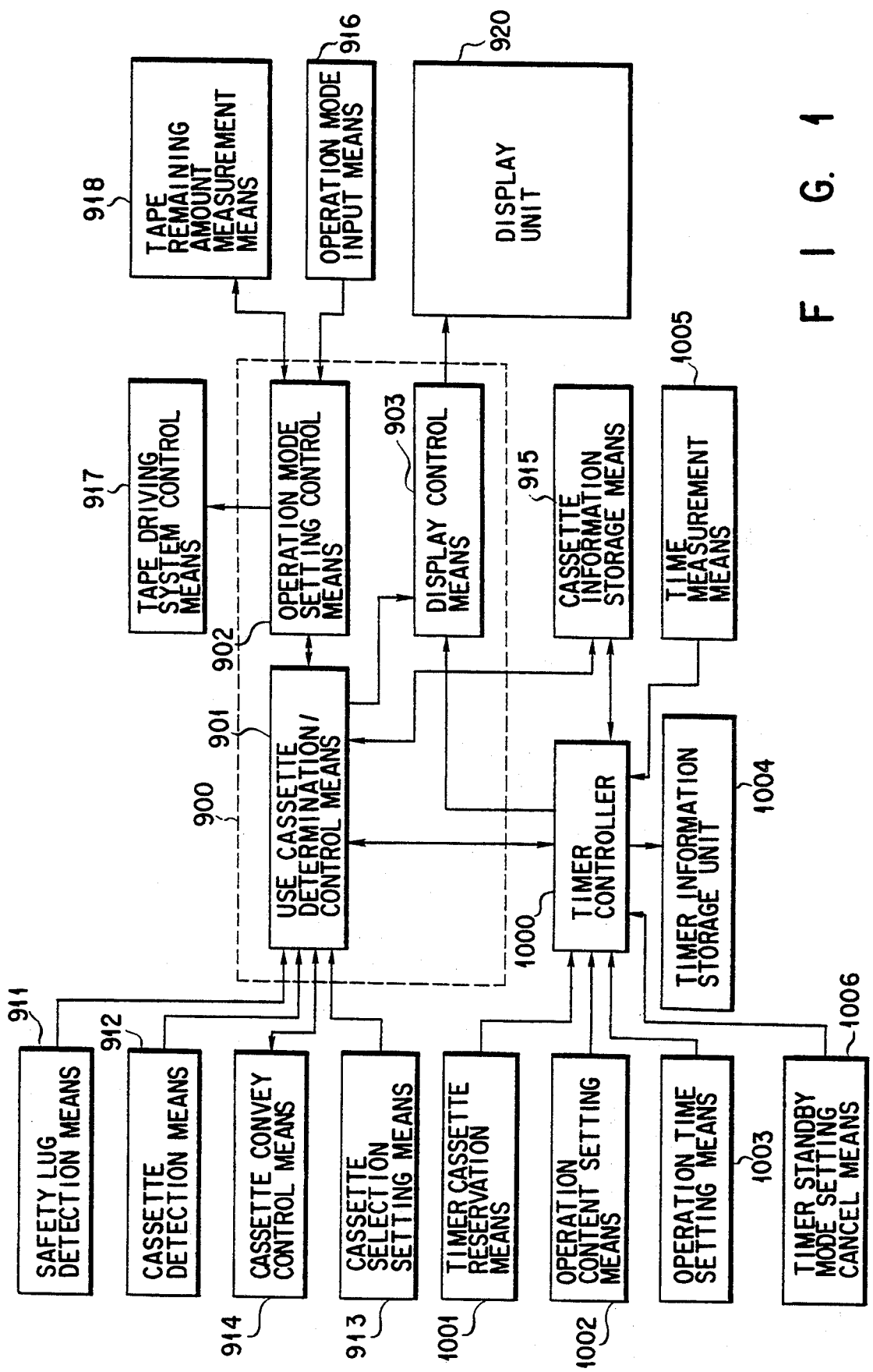
FIG. 1 is a block diagram showing a timer operation management apparatus according to an embodiment of the present invention.

FIG. 1 is a block diagram showing a VTR system according to an embodiment of the present invention, which can load a plurality of cassettes in advance. The VTR capable of loading a plurality of cassettes herein assumes an apparatus, which can place a plurality of cassettes on a tray unit, and can selectively and automatically convey and set a cassette to be subjected to a recording or play operation to a tape driving section. The detailed arrangement of the VTR will be described later, and a timer management system will be explained first.

Reference numeral 900 denotes a system controller, which employs a microcomputer. The system controller 900 fetches and processes pieces of information from respective units of the system, and also stores programs for controlling the functions of the respective units according to predetermined conditions. FIG. 1 illustrates only functions necessary for the present invention as blocks, i.e., a use cassette determination/control means 901, an operation mode setting/control means 902, and a display control means 903.

A generation source of information to be input to the use cassette determination/control means 901 will be described below. The use cassette determination/control means 901 receives safety lug detection information from a safety lug detection means 911, cassette detection information from a cassette detection means 912, and information from a cassette selection setting means 913. The use cassette determination/control means 901 also fetches information from the operation mode setting/control means 902.

Furthermore, the use cassette determination/control means 901 receives information from a timer controller 1000 for performing processing of a timer mode, cassette discrimination, and the like.

The safety lug detection means 911 detects the presence (recording enable)/absence (recording disable) of a safety lug provided to a cassette placed on each mount area of the tray unit in units of cassettes, and inputs the detection information to the use cassette determination/control means 901. The cassette detection means 912 detects whether or not a cassette is placed on each mount area, and inputs the information to the use cassette determination/control means 901. The cassette selection setting means 913 supplies information of a cassette designated by a user from a plurality of mounted cassettes to the use cassette determination/control means 901. The use cassette determination/control means 901 discriminates conditions of pieces of input information so as to control a cassette convey control means 914 to set a cassette selected from the plurality of cassettes to a tape driving position. In this manner, the selected cassette can be set in a recording or play state.

The pieces of information input to the use cassette determination/control means 901 are converted into a table, and the table is input to a cassette information storage means 915. The information in the cassette information storage means 915 can also be supplied to the use cassette determination/control means 901 directly or through the timer controller 1000.

The operation mode setting/control means 902 receives operation information from an operation mode input means 916. For example, the operation information includes instruction signals for instructing a recording mode, a play mode, a fast forward mode, a rewind mode, a stop mode, a high-speed play mode, a slow or double-speed play mode, and a tape remaining amount measurement mode.

When an instruction signal for instructing the tape remaining amount measurement mode is input, the operation mode setting/control means 902 inputs the input information to the use cassette determination/control means 901. The use cassette determination/control means 901 discriminates the presence/absence of mounted cassettes (looks up the table in the cassette information storage means 915). If the means 901 detects the corresponding cassette, it controls the cassette convey control means 914 to load the cassette to a predetermined tape driving position. When the cassette is loaded, the operation mode setting/control means 902 controls a tape driving system control means 917 to drive a tape, and also controls a tape remaining amount measurement means 918 to measure a tape remaining amount. After the tape remaining amount is measured, tape remaining amount data of the corresponding cassette is stored in the cassette information storage means 915 as information of the corresponding cassette. In this manner, the tape remaining amounts of loaded cassettes are measured in turn, and pieces of information in units of cassettes are stored in the cassette information storage means 915. When no cassette is loaded in the VTR, since information detected by the cassette detection means 912 is stored in the cassette information storage means 915, no remaining amount measurement is performed. In this case, an alarm display is made through the display control means 903 and a display unit 920. The tape remaining amount measurement mode includes a mode for obtaining tape remaining amounts of all the loaded cassettes, and a mode for measuring the tape remaining amount of a non-measured cassette without measuring the measured cassette. When a new cassette is loaded, and the remaining amount measurement mode is set, remaining amount measurement and display of the new cassette are automatically performed. More specifically, when a cassette is loaded in a cassette driving section, the system controller 900 is programmed to look up remaining amount data in the cassette information storage means 915, and to measure a remaining amount if no remaining amount data of the corresponding cassette is stored. The measured remaining amount is stored at a corresponding address of the cassette information storage means 915. When cassettes are subjected to a recording or play operation, the remaining amounts of the cassettes are sequentially measured by the measurement means 918, and are supplied to the cassette information storage means 915 to update old data. Note that the tape remaining amount data may be generated based on a tape counter output.

In a normal recording/play mode (excluding a case during execution of a timer operation), a cassette designated by a user through the cassette selection setting means 913 is placed at the tape driving position, and the system operates according to operation signals input through the operation mode input means 916. Alternatively, cassettes are selected and used in a predetermined order. For example, when cassettes A and B are used, the cassette A is assumed to be used first. After the cassette A is used to its tape end, it is automatically exchanged with the cassette B to continue an operation. In the rewind mode, after the rewind operation of the cassette B is ended, the rewind operation of the cassette A is started.

A timer reservation operation and a timer operation will be described below.

Reservation and operation functions associated with a timer are managed by the timer controller 1000.

The timer controller 1000 receives timer information from a timer cassette reservation means 1001, an operation content setting means 1002, and an operation time setting means 1003, and the timer information is stored in a timer information storage unit 1004. The timer cassette reservation means 1001 can designate a cassette to be subjected to a timer operation.

The operation content setting means 1002 can output operation content information for setting an operation content indicating whether a cassette is to be operated in the recording or play mode upon execution of the timer. Operation control utilizing the timer is normally used in the recording mode. Therefore, when only the recording mode is to be subjected to a timer operation, the operation content setting means 1002 becomes a recording operation setting means. In this case, if the timer controller 1000 can have a function of outputting a control signal for executing a recording operation, the operation content setting means 1002 can be omitted.

The operation time setting means 1003 can output timer time information for setting a timer execution time (start time and end time). Although not shown, signals from a timer reservation mode setting switch for performing able to timer reservation and a timer reservation made cancel switch for canceling timer reservation mode can also be input to the timer controller 1000.

It may be used as both the timer cassette reservation means 1001 and the operation time setting means 1003 with respect of the timer reservation mode. It may be planned, for example, when the operation of the timer cassette reservation starts the timer reservation is set, and when the end of setting the timer operation the timer reservation mode is canceled.

A timer standby setting/cancel means 1006 sets a timer standby mode which is able to execute the timer operation, and also outputs a signal for canceling the timer standby mode to the timer controller 1000.

The timer controller 1000 can input and store cassette designation information for designating a cassette to be subjected to a timer operation, operation content information, timer time information, and the like in the timer information storage unit 1004. The timer controller 1000 receives time data from a time measurement means 1005. The time measurement means generates current time and date information. Therefore, under a condition of the timer standby mode, when timer time information (start information) coincides with the current time information, the timer controller 1000 basically inputs cassette designation information and operation content information corresponding to the timer time information to the use cassette determination/control means 901. Then, the use cassette determination/control means 901 controls the operation mode setting/control means 902 to set a recording or play state of the designated cassette. When the timer time information (end information) coincides with the current time information, the timer controller 1000 supplies timer operation end information to the use cassette determination/control means 901.

The timer controller 1000 can access the cassette information storage means 915 to acquire data therefrom, and can also manage a content to be displayed on the display unit 920 through the display control means 903.

For the timer controller 1000, various safety measures for setting timer reservation, and for executing a timer operation are taken.

FIG. 2A shows a cassette information table formed in the cassette information storage means 915. Numbers or codes are set in this table according to the cassette mount positions (e.g., positions in the tray unit capable of loading a plurality of cassettes in advance). This case exemplifies codes A, B, C, .... These codes correspond to cassette identification codes. According to the mount positions, cassette presence/absence information, detection information indicating a recording enable or disable state, remaining amount information, and the like are stored.

FIG. 2B shows a timer information table formed in the timer information storage unit 1004. In the column of "designated cassette", designated cassette information input from the timer cassette reservation means 1001 is set. In the column of "operation content", operation content (recording or play instruction) information in a timer operation is set. In the column of "start", timer start time information is set. In the column of "end", timer end time information is set. Data stored in the column of "designated cassette" is the same as the cassette identification code. In this table, information indicating whether or not an operation is repeated during a reservation time is set in a "repetition" designation area. Furthermore, second and third timer operation times can also be set. These storage sections are related to each other by the timer controller 1000, and contribute to the timer reservation and operation functions.

The timer controller 1000, under the timer standby mode, compares time information from the time measurement means 1005 with information set in the reservation time area. When a coincidence is found between these pieces of information, the controller 1000 sends the corresponding cassette number and reservation content (recording or play) information to the use cassette determination/control means 901. At this time, interruption processing is forcibly started. The corresponding cassette is loaded to the predetermined cassette driving position, and the timer operation is executed in the designated mode.

(1) Since the above-mentioned system comprises a management system including the timer controller 1000, the timer cassette reservation means 1001, the operation content setting means 1002, the operation time setting means 1003, the timer information storage means 1004, and the like, a VTR capable of setting a plurality of cassettes in advance can execute an arbitrary timer recording or play operation for an arbitrary cassette. In addition, a plurality of cassettes can be easily subjected to continuous timer operations. (2) When the timer management system executes a timer operation, the use cassette determination/control means 901 is interrupted. Therefore, a forced timer operation is executed, and a recording error can be prevented. This feature is particularly effective when a user Y is free to use a VTR after a user X sets a timer recording mode. Of course, when the timer standby mode is canceled by the timer standby setting/cancel means 1006, the forced interruption is not executed.

FIG. 3 shows a program executed when a timer reservation operation is performed. When the timer reservation mode is set, the control waits for input of a designated cassette. When designated cassette information is input from the timer cassette reservation means 1001, the cassette information storage means 915 is accessed to determine the presence/absence of the corresponding cassette (steps S1 to S3). When the corresponding cassette is absent, an alarm operation (flashing, buzzer, character display, or the like) is performed. In addition, a recordable cassette is searched, and its identification code is displayed (step S4). If no cassette is mounted, feed control of the tray unit is performed. On the other hand, if another cassette is detected, it is waited for a predetermined period of time to check whether or not the timer reservation mode is canceled. If the timer reservation mode is not canceled, the flow returns to step S2; otherwise, the flow returns to step S1. Step S6 is provided to give an opportunity for a user to load a cassette.

If it is determined in step S3 that the corresponding cassette is present, it is determined if the cassette has a safety lug (step S8). If the cassette has a safety lug, and recording is possible, an operation content is fetched, and timer time information is input and fetched (steps S11 and S12). However, if the cassette has no lug, since recording is impossible, alarm processing is performed. In addition, an operation content is fetched to discriminate it (steps S9 and S10). Even when the cassette has no lug, not a recording mode but a play mode may be designated. When the play mode is designated, the flow advances to step S12, and timer time information is fetched. When the timer time information is input, the cassette identification code and pieces of information are paired, and are stored in the timer information storage unit 1004. At this time, one timer program is reserved. When the next program is to be reserved, the flow returns to step S2, and input operations are performed from input of a designated cassette in the same manner as described above. Cassettes need not be designated in units of programs, but may be automatically assigned in the order of timer operation times. In the timer standby mode, a cassette designated by a program having the earliest start time, or a predetermined cassette is loaded to the tape driving section. In the timer standby state, a recording/play operation may be performed using a non-designated cassette until a start time is reached. In this case, when the start time is reached, the designated cassette is loaded to the cassette driving section.

Figure 4:
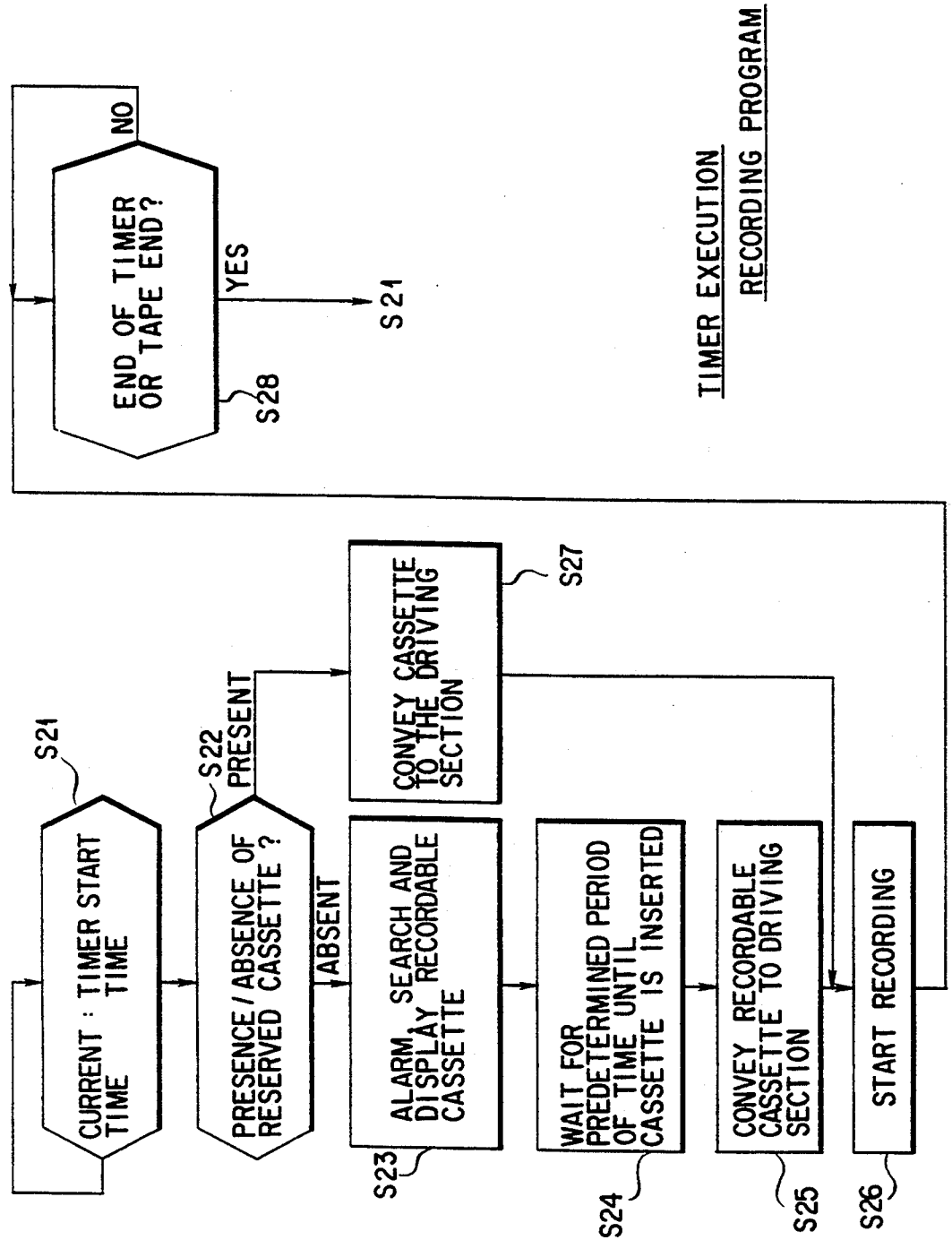
FIG. 4 is a flow chart showing a timer execution recording program utilized in the system of the present invention.

FIG. 4 shows a program after the timer recording mode is set.

The current time and timer start time are compared with each other at predetermined time intervals. If the current time coincides with one of start time data stored in the timer information storage unit 1004, it is checked if the identification code of the cassette corresponding to the start time data is stored in the cassette information storage means 915. If the cassette is present, the reserved cassette is conveyed to the driving section in step S27, and the recording operation is started (step S26). If the cassette is not present, the alarm processing is performed. Thereafter, information in the cassette information storage means 915 is looked up to detect a recordable cassette, and the identification code of the detected cassette is displayed (step S23). In step S24, the control waits for a predetermined period of time until a new cassette is inserted. In this case, when the alarm processing is performed, a user may notice this alarm, and may insert a desired cassette. If a cassette is not inserted after an elapse of the predetermined period of time, the previously detected recordable cassette is loaded to the driving section, and the recording operation is started (steps S25 and S26).

Note that a user is not often present near a VTR upon execution of timer recording. In this case, since the user cannot insert a new cassette, as a matter of course, step S24 can be omitted.

After the recording operation is started, the current time and timer end time are compared with each other. If a coincidence is found between the two times, the recording operation is stopped (step S28), and the flow returns to step S21. Note that a reserved cassette often has already been loaded to the driving section when a recording operation is started. Thus, although not shown, the control also includes a function of discriminating this state, and a routine for advancing the flow to recording start step S26 without operating the convey function.

FIG. 5 shows a program executed when the play mode is designated as the timer operation content. When the current time coincides with a timer start time, the presence/absence of the reserved cassette is checked. If the reserved cassette is absent, alarm processing is executed (steps S31, S32, and S33). The control waits for a predetermined period of time until a new cassette is inserted. If a new cassette is inserted, the play mode is started. However, if a new cassette is not inserted, data (timer information) associated with the reserved cassette are cleared, and the flow returns to step S31. If it is determined in step S32 that the reserved cassette is present, the flow advances to step S36 to execute the play mode, and comparison between the current time and timer end time is started (step S36). If a comparison result indicates a non-coincidence, it is checked if the tape end is reached. If it is determined that the tape end is not reached, the play operation is continued. If it is determined that the tape end is reached, and the end time coincides with the current time, the play operation is stopped, and the flow returns to step S31. Although not shown, after step S36, a routine for starting the step of exchanging a cassette is also executed. Note that the tape end information is fetched from the operation mode setting means to the use cassette determination/control means 901, and the timer controller monitors this information.

The above description independently exemplifies the programs executed when both the recording and play modes are designated as the timer operation. However, it is easy to alternately execute recording and play timer operations. In practice, steps S21 and S31 of comparing the current time and timer start time are con, non to each other, and as the next step, although not shown, the step of discriminating whether the recording or play mode is designated as the operation content is present. If the recording mode is designated, the control enters the routine shown in FIG. 4; otherwise, the control enters the routine shown in FIG. 5.

When a plurality of cassettes can be loaded in advance, the cassettes are exchanged in the VTR. Therefore, a cassette, which is being subjected to a tape driving operation in the tape driving section, and a cassette, which is simply in a standby state, are present in the VTR. In this system, a timer setting operation can be performed for a standby cassette even during the tape driving operation of one cassette. When a timer setting operation is performed in this manner, if a timer execution time is reached, even the standby cassette is forcibly conveyed and loaded to the tape driving section, and the timer operation can be executed.

However, in this system, there are two cases, i.e., a case wherein a cassette to be subjected to a timer operation is initially loaded to the tape driving section, and the timer operation is started, and a case wherein a cassette to be subjected to a timer operation is set in a standby state, and is then moved and loaded to the tape driving section, and thereafter, the timer operation is started. These two cases make a large difference in actual recording start time especially when the power switch of the VTR is turned on, and the timer operation is started.

FIGS. 6A and 6B show a timer execution operation time switching function assembled in the routines shown in FIGS. 4 and 5.

In the description of FIG. 4, the reserved cassette is loaded to the tape driving section in step S27. In the description of FIG. 5, if it is determined in step S32 that the reserved cassette is present, the flow advances to step S36 to execute the play operation, and the play operation is continued until the timer end time.

However, in practice, if the reserved cassette is present, a function of discriminating a state of the reserved cassette is operated first. When the reserved cassette has already been loaded to the tape driving section, a time required until the recording or play operation is started can be short. However, when the reserved cassette is not loaded to the tape driving section, a time required until the recording or play operation is started is prolonged. Therefore, in consideration of this time difference, the above-mentioned function is executed so as not to delay start of the recording operation in both the cases.

FIG. 6A shows a routine (corresponding to step S12 in FIG. 3) executed when a reservation time is fetched in the timer reservation operation. An advanced time is calculated based on reservation time data, and is stored in the timer information storage unit 1004. The advanced time is calculated by subtracting $(T1+T2)$ from the reservation time T0. T1 is a general preparation time, i.e., a pause time, which is necessary for preparation when the power supply of a recording or play system circuit is turned on. T2 is a time required until a cassette, which is located not in the tape driving section but at the standby position, is moved to be loaded to the tape driving section, and the tape loading operation is completed. Therefore, in practice, a time advanced by $(T1+T2)$ from a time designated by a user is stored. Therefore, in practice, a time (advanced time) advanced by $(T1+T2)$ from a time stored in the timer information storage means 1004 is compared with the current time.

FIG. 6B shows a processing routine executed when a timer start time (advanced time) and the current time coincide with each other. In this system, when the advanced time coincides with the current time, the state of the reserved cassette is checked (step S41). This state checking step can be attained by, e.g., monitoring a controlled state of the cassette convey control means 914 by the system controller 900. This is because the use cassette determination/control means 901 holds control state information when it selectively performs convey control of a cassette to the tape driving section. When the reserved cassette is present at the tape driving position, a wait time equal to the time T2 is set (step S42). An elapse of a pause time equal to the time T1 is waited, and thereafter, a recording or play operation is started at a time set by a user (steps S43 and S44). If it is determined in step S41 that the cassette is in an escape state (standby state), convey and exchange operations of cassettes are immediately executed in step S45, and the reserved cassette is mounted at the tape driving position to perform a tape loading operation. In step S46, a signal processing circuit system is turned on, and a pause state of the time T1 is started (step S46). After an elapse of the time T1, a recording or play operation is started.

When the above-mentioned operations are performed, even if a designated cassette is located at the escape position separate from the tape driving section or the mount position to the tape driving section, the reservation time set by a user can coincide with an actual recording or play start time.

In a conventional timer system, the timer execution start time falls within a range of T1. When the conventional system is used, since a cassette exchange time is included in the range of T1, the actual recording start time may be delayed. However, according to the above-mentioned system, an advanced period up to a timer execution start timing can be switched depending on whether or not a cassette is automatically exchanged (i.e., a preparation period is switched). Therefore, the timer execution time is always stable.

This method is not limited to the above embodiment, and various other embodiments are available. In the above embodiment, the timer operation start time is advanced from the actual current time. Alternatively, current time (output from a timepiece circuit) data may be advanced, and may be compared with a timer start reservation time. The time T1 is defined as a general preparation time, i.e., a pause time, but need not always be the pause time. For example, the time t1 may be a period for the stop mode or the recording mode. When a reserved cassette is present at the tape driving position, the time T2 is defined as a waiting time. However, this time may be a time for another mode. That is, a waiting time until a recording or play operation is actually started need only be equal to the time T2. This is because the reserved cassette may be operated in another mode. In this case, the current mode is canceled, and the target timer operation can be started.

The above-mentioned timer recording operation is not executed unless the timer standby mode is set. Even in the timer standby mode, since a normal recording/play operation can be performed, a timer standby mode setting/canceling means 1006 must be operated carefully. More specifically, after a user X sets the timer standby mode, a user Y uses the VTR, and may erroneously cancel the timer standby mode. When such an erroneous operation is performed, the timer recording operation cannot be executed contrary to expectations of the user X. Thus, in this system, the following agreement is concluded in the operation input data processing program between the timer standby mode setting/canceling means 1006 and the timer controller 1000. More specifically, the priority order is provided to cassettes or programs, so that the canceling operation of the timer standby mode for a timer program corresponding to a cassette having a higher priority order is set to be different from that for a timer program corresponding to a cassette having a lower priority order. Alternatively, the canceling operation of the timer standby mode for a timer program having a higher priority order is set to be different from that for a timer program having a lower priority order. For example, when the priority order is high, the timer standby mode cannot be canceled unless the timer standby mode setting/canceling means 1006 is operated several times. Since the operation input data processing program is arranged as described above, the timer mode cannot be easily canceled, and this system has high reliability on timer recording.

As an operation input data processing method associated with the standby state and the canceling operation of the timer mode, various other methods are available. For example, a priority order may be set in advance for a plurality of cassettes. When the timer mode of a cassette having the lowest priority order is to be canceled, the timer mode cancel switch need only be depressed once. When the timer mode of a cassette having the second lowest priority order is to be canceled, the timer mode cancel switch must be depressed twice. In this manner, the number of times of switch operations necessary for canceling the timer mode is increased for cassettes having a higher priority order. Thus, the timer reservation of a cassette to be subjected to timer recording can be prevented from being canceled.

FIG. 6C shows a function associated with the timer controller 1000 and the timer standby mode setting/canceling means 1006. The timer standby mode setting/canceling means 1006 comprises a priority order setting means 1006a, a priority order storage means 1006b, a standby setting means 1006c, and a standby canceling means 1006d. The priority order setting means 1006a outputs a priority order signal indicating priority order levels of two cassettes or a plurality of timer programs set by a user. The priority order signal is stored in the priority order storage means 1006b. The standby setting means 1006c outputs a timer standby signal for setting the timer standby mode, and supplies it to the timer controller 1000. Note that the timer information storage means 1004 may also serve as the priority order storage means 1006b. The timer standby mode can be set for only a cassette selected by the cassette selection setting means 913, or can be set for all the cassettes. The timer standby signal is supplied to the timer information storage means 1004, and is stored in a memory area (FIG. 2B) of a corresponding cassette as standby information. Note that the standby information area is not shown in FIG. 2B. The standby canceling means 1006d outputs a canceling signal for canceling the timer standby mode, and supplies it to the timer controller 1000. The standby setting means 1006c and the standby canceling means 1006d respectively have buttons operated by a user, and upon operation of the corresponding button, the timer standby signal or the canceling signal is output.

An embodiment wherein two cassettes A and B can be loaded in the VTR upon setting a priority order to cassettes will be described below. When the canceling signal is input from the standby canceling means 1006d to the timer controller 1000, the timer controller 1000 refers to the cassette priority order stored in the priority order storage means 1006b. If the priority order is set, the timer controller 1000 does not cancel the timer standby mode. When the canceling signal is subsequently input, the timer controller 1000 cancels the timer standby mode.

The canceling operation of the timer standby mode can be performed in units of cassettes. For example, the canceling operation may be set as follows. That is, when the priority order of the cassette A is higher than that of the cassette B, the timer standby mode of the cassette B is canceled, and the timer standby mode of the cassette A is inhibited from being canceled when the canceling signal is input from the standby canceling means 1006d to the timer controller 1000. In this case, the timer standby mode of the cassette A is also canceled in response to the next canceling signal. More specifically, when the canceling signal is input to the timer controller 1000, the timer controller 1000 refers to the priority order stored in the priority order storage means 1006b, increments a count value of a counter corresponding to the cassette A by +1, and does not cancel the timer standby mode. When the canceling signal is subsequently input, i.e., when two canceling signals are subsequently input, the timer controller 1000 cancels the timer standby mode of the cassette A. Furthermore, a cassette may be selected by the cassette selection setting means 913, and the timer standby mode of the selected cassette may be canceled. In this case, the necessary number of input times of the canceling signal is also changed according to the priority order of the selected cassette. The canceling operation of the timer standby mode is attained by clearing timer information in units of cassettes stored in the timer information storage means 1004.

The standby canceling operation of a cassette or a timer program having a higher priority order may be performed based on a duration of the canceling signal in place of the number of input times of the canceling signal. Furthermore, the format of the canceling signal itself may be changed, so that the standby mode is canceled by inputting an identification number. In addition, various other embodiments may be available. For example, a button for canceling the standby mode of a cassette having a higher priority order may be arranged in addition to that for canceling the standby mode of a cassette having a lower priority order.

In the above embodiment, the priority order setting means and the priority order storage means may be replaced with a protection level setting means and a protection level storage means. The protection level means a level against the timer cancel signal. That is, the timer reservation of a cassette having a low protection level is canceled in response to one cancel signal. The timer reservation of a cassette having a high protection level is canceled after a plurality of cancel signals are input.

In the embodiment shown in FIG. 6C, the standby setting means 1006c is arranged. As another arrangement, upon completion of reservation of a timer program shown in FIG. 3, the timer standby mode may be automatically set. In this case, the standby setting means 1006c can be omitted.

When a plurality of cassettes can be loaded in advance, a tape loaded to the tape driving section, and a simply standby tape are present in the VTR. The VTR has a timer setting function, and the like in addition to recording (Rec), play (Play), rewind, fast forward, stop functions, and the like. In this system, a timer setting operation, or the like can be performed for a standby cassette even during an operation of another cassette. However, in this case, a user must perform the timer setting operation, or the like after he or she clearly recognizes the operating cassette and the standby cassette. If the user performs the timer setting operation, or the like for the operating cassette, a recording error may occur depending on a setting time.

In this system, when the operating conditions of a plurality of cassettes loaded in the VTR are displayed, the operating cassette can be distinguished from the standby cassette, thereby improving operability.

The VTR also has a display function of a counter/remaining amount, a counter, or the like. In some cases, a user wants to check the tape counter or remaining amount of the standby cassette as well as the counter/remaining amount display of the cassette in access. However, when the tape counter or remaining amount display areas for all the cassettes are provided, this results in a large display unit, and difficult identification of display contents.

Thus, in this system, counter/remaining amount information of a plurality of cassettes loaded in the VTR can be desirably and selectively displayed by a single display means.

In addition, it is convenient for a user to be able to perform a timer setting operation for a standby cassette. However, in some cases, when a timer setting operation is performed for a single cassette, a recording or play time may become short.

Thus, this system allows easy understanding of timer reservation conditions of a plurality of cassettes loaded in the VTR, thus improving operability.

When a recording/play operation of a standby cassette is to be reserved, there are two cases, i.e., a case wherein it is better to solely select a cassette, and a case wherein it is better to continuously select cassettes so as to perform a long-time recording/play operation.

Thus, in this system, display areas of standby cassettes of a plurality of cassettes loaded in the VTR are arranged in correspondence with these plurality of cassettes, so that timer reservation conditions, recording possible/impossible conditions, and the like can be visually and easily understood, thereby improving operability.

Figure 7:
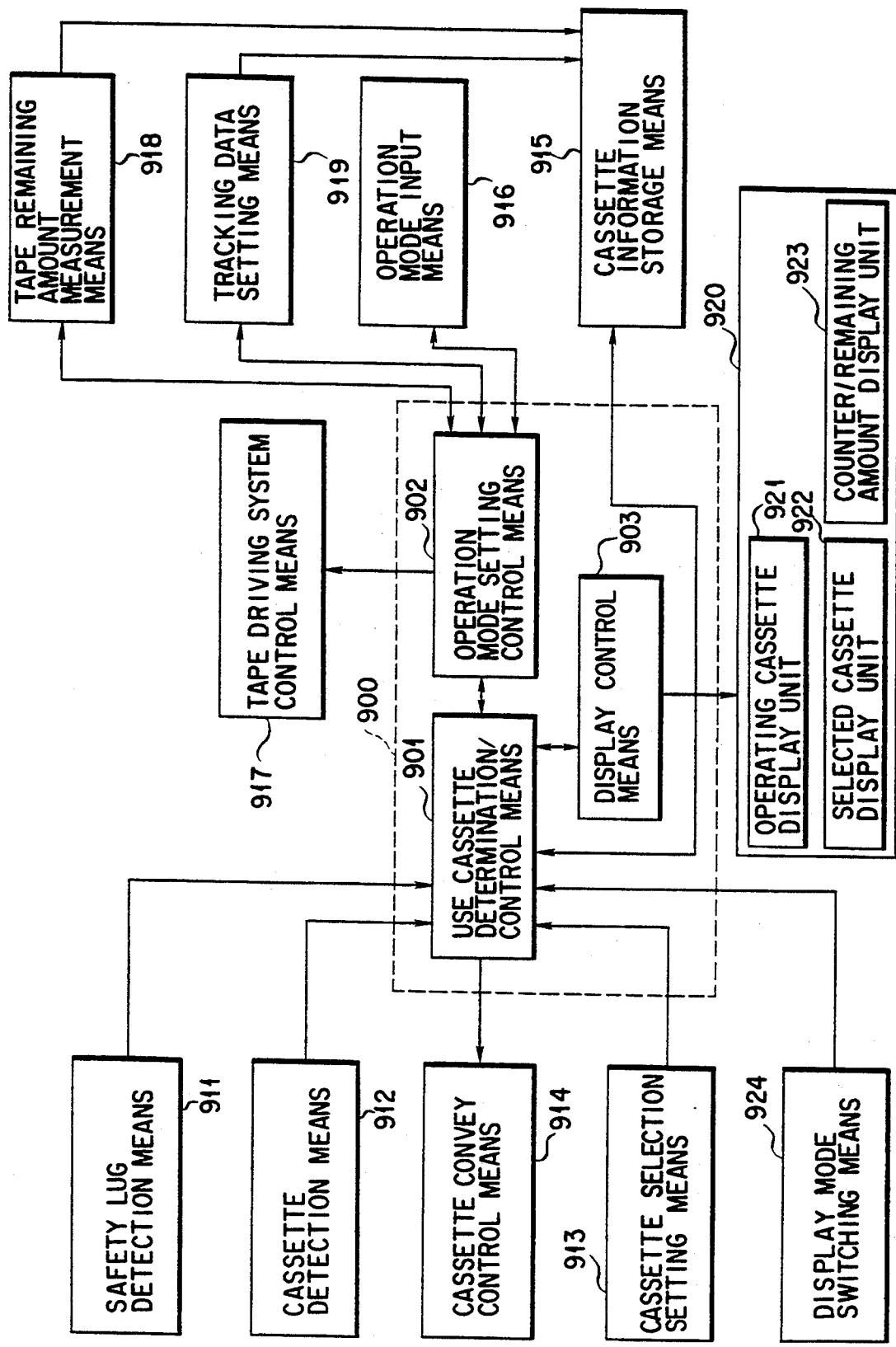
FIG. 7 is a block diagram showing a timer operation management apparatus according to another embodiment of the present invention.

FIG. 7 shows a VTR system including a display control system and a tracking data setting means 919 utilized when the system of the present invention is operated. Note that the same reference numerals in FIG. 7 denote the same blocks as those in FIG. 1, and a detailed description thereof will be omitted.

In this system, the operation mode setting/control means 902 can exchange data with the tracking data setting means 919. When a plurality of cassettes are selectively subjected to a play operation, tapes recorded by other VTRs may be mixed. Since tracking characteristics of VTRs are slightly different from each other, tracking adjustment is often performed so as to obtain the best tracking characteristics according to cassette tapes. When the tracking adjustment is performed by a user through the tracking data setting means 919, tracking adjustment data is supplied to the cassette information storage means 915, and is stored at an address of the corresponding cassette. When the corresponding cassette is selected again to perform a play operation, the corresponding tracking adjustment data is automatically read out from the cassette information storage means 915, and is supplied to the tracking data setting means 919 through the use cassette determination/control means 901 and the operation mode setting/control means 902. As a tracking adjustment method, various methods are available. For example, a method of adjusting a delay time constant in a channel of head switching pulses is known.

Thus, a table shown in, e.g., FIG. 2A is formed in the cassette information storage means 915. More specifically, in addition to the above description, a "tracking" area is formed. In this area, tracking adjustment data obtained from the tracking data setting means 919 is stored in correspondence with cassettes. In addition, a "selection setting" area may be allocated. This area stores setting information from the cassette selection setting means 913. When a user designates a use cassette, designation information is stored in the corresponding area.

As described above, since this system comprises the cassette information storage means 915, information in the means 915 can be looked up upon setting of an operation mode of the VTR. When cassette information is looked up, various operations can be facilitated. In particular, once counter/remaining amount data, and tracking adjustment data are set, the remaining amount measurement and tracking adjustment need not be repetitively performed when the corresponding cassette is selected, thus achieving quick and proper cassette exchange and use.

When the absence of a cassette is determined, data of the corresponding mount position is cleared. When the cassette convey control means 914 is exposed outside the VTR, and a change in detection signal from the cassette detection means 912 is detected, this means that a user exchanges cassettes outside the VTR. At this time, the system controller 900 controls the cassette information storage means 915 to clear cassette information of the corresponding mount position.

The display unit 920 of this system independently comprises an operating cassette display section 921, and a selected cassette display section 922.

Data obtained from the cassette selection setting means 913, and data obtained from the operation mode input means 916 will be defined below. The cassette selection setting means 913 outputs designation data for selecting and designating one of a plurality of cassettes. The operation mode input means 916 outputs management data such as cassette subsidiary information, e.g., counter/remaining amount checking data, recording possible/impossible checking data, and the like for a cassette designated by the cassette selection setting means 913 according to an operation content, or management data such as tape driving instruction (recording, play, rewind, and the like) information.

The system controller 900 receives input data from the cassette selection setting means 913 and the operation mode input means 916. When management data from the operation mode input means is instruction data of cassette subsidiary information, display data (A or B) for identifying an objective cassette is displayed on the selected cassette display section 922. Contrary to this, when management data from the operation mode input means 916 is data requesting a tape driving (recording, play, or the like) operation, display data for identifying an objective cassette is displayed on the operating cassette display section 921.

Furthermore, assume that when a cassette (e.g., A) in a tape driving state is displayed on the operating cassette display section 921, a standby cassette (e.g., B) is selected and designated, and thereafter, management data such as counter/remaining amount checking data, timer setting data, recording possible/impossible checking data, or the like is input. In this case, identification display data (B) of the selected cassette is displayed on the selected cassette display section 922.

Thus, a user can perform operations while confirming a current objective cassette of a timer setting operation. When management data such as counter/remaining amount checking data or recording possible/impossible checking data is input, the system controller 900 reads out data from the cassette information storage means 915, and displays it at a predetermined position on the selected cassette display section 922.

The operation mode input means 916 can also input a function of setting a recording or play order as management data. In this case, order designation information is input to the cassette information storage means 915, and is stored in the column of the corresponding cassette. When tape end detection information or cassette exchange request information is input to the system controller 900, the order designation information is fetched under the control of the system controller 900, and a cassette having an order next to the cassette that has completed the recording or play operation is conveyed by the cassette convey control means 914.

As described above, this system comprises the selected cassette display section 922 for, when a plurality of cassettes are loaded in the VTR, identifying a cassette in a standby state, which is to be associated with subsidiary information (e.g., timer information) even in a driving state of another cassette. Thus, an operative convenience and easy feeling can be obtained, thus improving reliability of the VTR system.

Since the display control means 903, a display mode switching means 924, the cassette information storage means 915, and the cassette selection setting means 913 are used in combination, this system can perform the following operations.

More specifically, the counter/remaining amount of an access cassette mounted in a cassette (tape) driving section is normally displayed on a counter/remaining amount display section 923. However, when a display mode switching signal is input, and the cassette selection setting means is operated, a user can sequentially display and confirm the counters/remaining amounts of standby cassettes.

More specifically, upon reception of the display mode switching signal from the display mode switching means 924, and designation data from the cassette selection setting means 913, the display control means 903 reads out counter/remaining amount information of a standby cassette corresponding to the designation data from the cassette information storage means 915, and supplies the readout information to the display section 923. Thus, a user can check the remaining amount of a standby cassette other than the access cassette. The display control means 903 operates, e.g., a counter in response to the display mode switching signal from the display mode switching means 924, and the cassette designation data from the cassette selection setting means 913. When the next designation data is not input within a predetermined period of time (i.e., when remaining amount checking designation of the next cassette is not made), the means 903 clears the display mode switching signal, and restores a normal remaining amount display state. More specifically, the counter/remaining amount corresponding to an access cassette is displayed.

Figure 8:
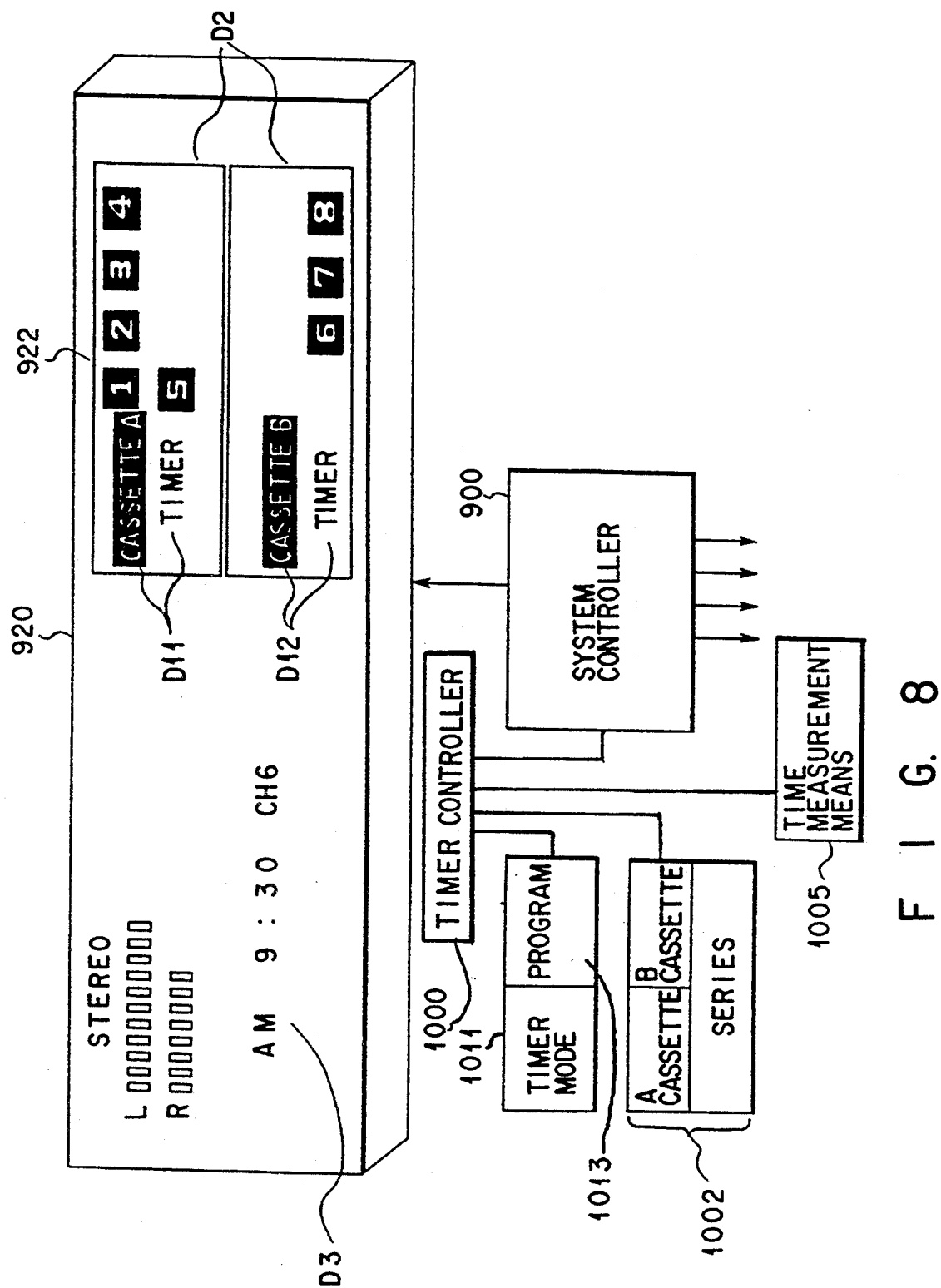
FIG. 8 is an explanatory view showing an operation unit and a display example of a timer operation management apparatus according to still another embodiment of the present invention.

FIG. 8 shows another embodiment of the present invention.

Reference numeral 900 denotes a system controller and numeral 1000 denotes a timer controller of a VTR that adopts the present invention. This VTR can load a plurality of cassettes in advance, as will be described later, and cassettes can be exchanged in the VTR. The timer controller 1000 receives an output from a timer mode switch 1011 for setting a timer reservation mode capable of inputting a recording start time and end time. When the timer reservation mode is set, the timer controller 1000 waits until data for designating a cassette to be subjected to a timer setting operation is input. The system controller 900 can control a display mode of a display unit 920. FIG. 8 illustrates portions associated with the timer reservation mode. However, in practice, the display unit 920 has other display sections.

In the timer reservation mode, one of a plurality of cassettes (two cassettes A and B in this case) can be designated, and a series of cassettes (i.e., both the cassettes A and B) can also be designated.

When cassettes are individually designated, the cassettes can be designated in units of timer programs. In addition, only a predetermined cassette can be designated, and a timer reservation operation can be performed for the designated cassette. When a series of cassettes are designated, for example, a timer recording operation is executed up to the tape end of the cassette A in the order of reserved program times, and thereafter, a recording operation is similarly performed for the cassette B. This designation can be made by a cassette designation switch 1012. When the output from the cassette designation switch 1012 is input to the timer controller 1000, the system controller 900 causes the display unit 920 to perform displays on first display sections D11 and D12 for identifying cassettes, and to perform displays on a second display section D2 for identifying whether the cassettes are independently designated or all the cassettes are designated.

In the case of FIG. 8, "cassette A, timer" and "cassette B, timer", on the first display sections, are displayed, and the display regions of the cassettes A and B are independently surrounded by line frames. The line frame displays indicate that timer reservation operations are or will be independently performed for the cassettes A and B.

Hollow numerals in the line frame indicate program numbers. More specifically, in this case, a total of eight programs can be reserved. FIG. 8 illustrates a state wherein program numbers "1" to "5" are reserved for the cassette A, and program numbers "6" to "8" are reserved for the cassette B.

FIG. 9 shows a state wherein the line frame of the second display section D2 surrounds the overall display regions of the cassettes A and B. This display indicates that a timer reservation operation is or will be performed for a series of cassettes A and B.

In this series designation, since the relationship between program numbers and cassettes is not specified, eight program numbers are simultaneously displayed at one (cassette A) side.

Furthermore, when the cassette A is selected as a cassette to be reserved (i.e., when an A cassette switch of the cassette designation switch 1002 is depressed), the system controller 900 causes "cassette A" of the first display section D11 to flash. Thus, a user can perform a timer reservation operation for the cassette A. The system controller 900 also receives current time data from a timepiece circuit 1300 (corresponding to the time measurement means 1005), and this data is utilized to obtain an actual timer operation.

Figures 10A, 10B:
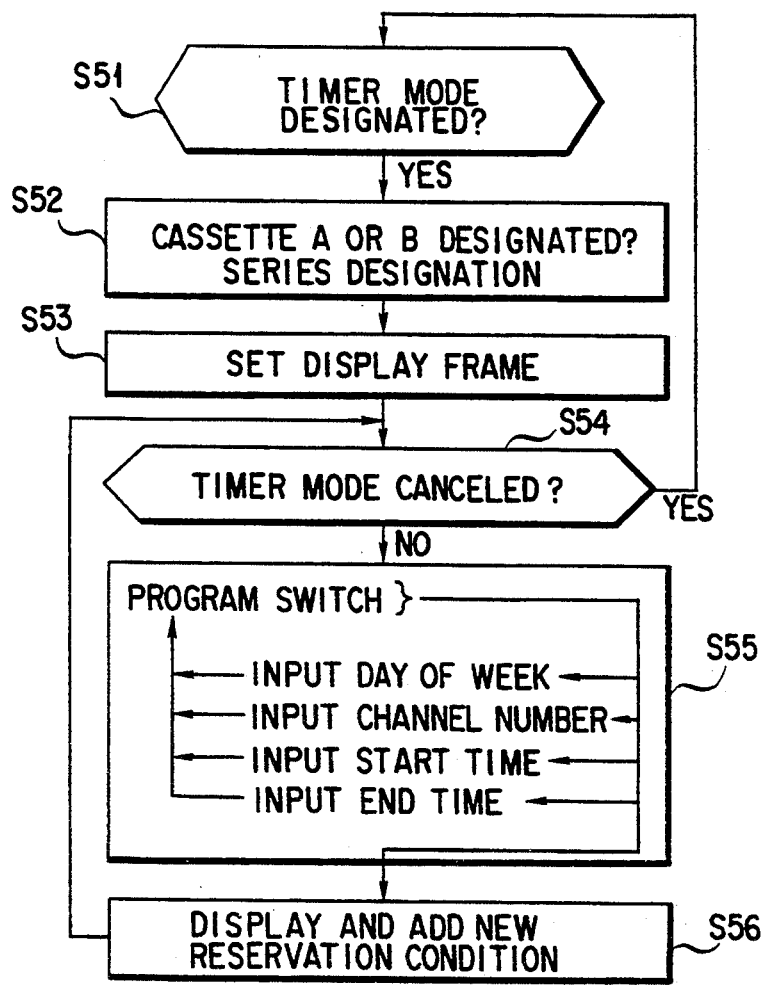
FIG. 10A is a flow chart showing an operation input program of the timer operation management apparatus according to the present invention.
FIG. 10B shows a timer information memory table utilized in the timer operation management apparatus according to the present invention.

FIGS. 10A and 10B respectively show a program in the timer controller 1000 and a table in a timer information storage unit upon execution of timer reservation. When the timer reservation mode switch 1011 is operated to set the timer reservation mode (step S51), displays shown in FIG. 8 or 9 can be obtained. When no timer reservation is performed, only "cassette A" and "cassette B" are displayed. Then, the cassette A or B, or a series of these cassettes are designated (step S52). If the cassette A is designated, flashing of "cassette A" is started, and as shown in FIG. 9, the second display section D2 is displayed to be split into two sections (step S53).

Thereafter, the input operation of a reservation time is started. Prior to this input operation, it is checked if the timer reservation mode is canceled. The timer reservation mode can be canceled by depressing the timer reservation mode switch 1011 again (step S54). When the timer reservation mode is not canceled, the control enters a timer execution time input mode (step S55). In the timer execution time input mode, a program switch 1013 is operated. When the program switch 1013 is depressed once, an input is allowed at the position of the day of week. The day of week can be input by, e.g., depressing a day-of-week button provided to a ten-key pad. When the program switch 1013 is depressed, a number of broadcasting channel input state is set by using the ten-key pad. When the program switch 1013 is depressed again, a start time input state is set. The start time can be input in the order of " " o'clock and " " minutes using the ten-key pad. When the program switch 1013 is further depressed, an end time input state is set. The end time can also be input in the order of " "
o'clock and " " minutes. The input data can be checked by a portion normally used as a timepiece display section D3. When the program switch 1013 is further depressed, a reservation condition can be displayed, and reservation for one program number "1" is completed. The reservation condition, i.e., how many programs are reserved is displayed using numerals adjacent to the display position of "cassette A" (step S56).

Assuming that the first program of the cassette A is being reserved, "1" of the item of "cassette A" on the first display section D11 flashes, and upon completion of step S55, the flashing indication is stopped. FIG. 8 also illustrates "2" to "5". However, when only one program is reserved, only "1" is displayed. When the program switch 1013 is depressed again without canceling the reservation mode from step S56, the reservation operation of the second program is allowed in turn. Thus, "2" is displayed, and begins to flash. In this manner, the reservation operations for the cassette A are performed. FIG. 8 illustrates a state wherein the reservation operation of the fifth program is completed. When the reservation operation for the cassette B is performed, the timer reservation mode is temporarily canceled, and is set again. Thus, since the routine shown in FIG. 10A advances to step S52, the cassette B is designated in this step.

Of course, in this system, when the timer reservation mode is set, the reservation condition of each cassette so far is displayed. If the cassettes are independently designated, and five programs for the cassette A, and eight programs in three total for the cassette B have already been reserved, a display state shown in FIG. 8 is obtained.

The display unit 920 comprises, e.g., a liquid crystal display system, and display item data are stored in a memory. Data stored in the memory are read out according to the reservation condition.

A timer information memory is provided in the timer controller 1000. As shown in FIG. 10B, the timer information memory has an area for storing a pair of start and end time data, and a cassette designation data storage area for identifying if either of the cassettes A and B is designated at that time, or if a series of cassettes are designated.

FIG. 11 shows a program executed when a timer operation is obtained.

Every time one minute elapses, for example, the control starts comparison processing between the timer time and current time in step S61. The current time is compared with start time data in the timer memory, and if a coincidence is found between the two data, it is checked if either of the cassettes A and B is designated, or if a series of cassettes are designated (step S63). If the cassette A is designated (determined based on data in the corresponding column of the timer memory), the cassette A is fed to the cassette driving section, and the recording mode is started (S64 and S65). If the cassette B is designated, the cassette B is fed to the cassette driving section, and the recording mode is started (S66 and S65). If a series of cassettes are designated, a recording operation is automatically performed from the cassette A, and it is checked if the counter/remaining amount is sufficient (step S67). If it is determined that the counter/remaining amount is insufficient, the cassette is exchanged with another cassette (step S68), and the recording mode is started (step S65). The number of times of cassette exchange operations is regulated according to the number of cassettes to be used. When two cassettes are used like in this case, and when the first exchange operation is performed, an alarm display is performed at the second exchange operation of one cassette.

Note that step S67 includes a function of judging whether or not a tape end is reached. If it is determined that the tape end has been reached, a cassette is exchanged.

Upon comparison of the timer time, if a coincidence with end time data other than the start time data is obtained, the recording mode is stopped (steps S69 and S70), and the flow returns to step S61.

As described above, this system can perform simple displays of timer reservation procedures and reservation conditions of cassettes, resulting in easy use.

The identification display mode for allowing easy understanding of the reservation condition is not limited to the above-mentioned mode, and various modifications may be made.

Figure 12:
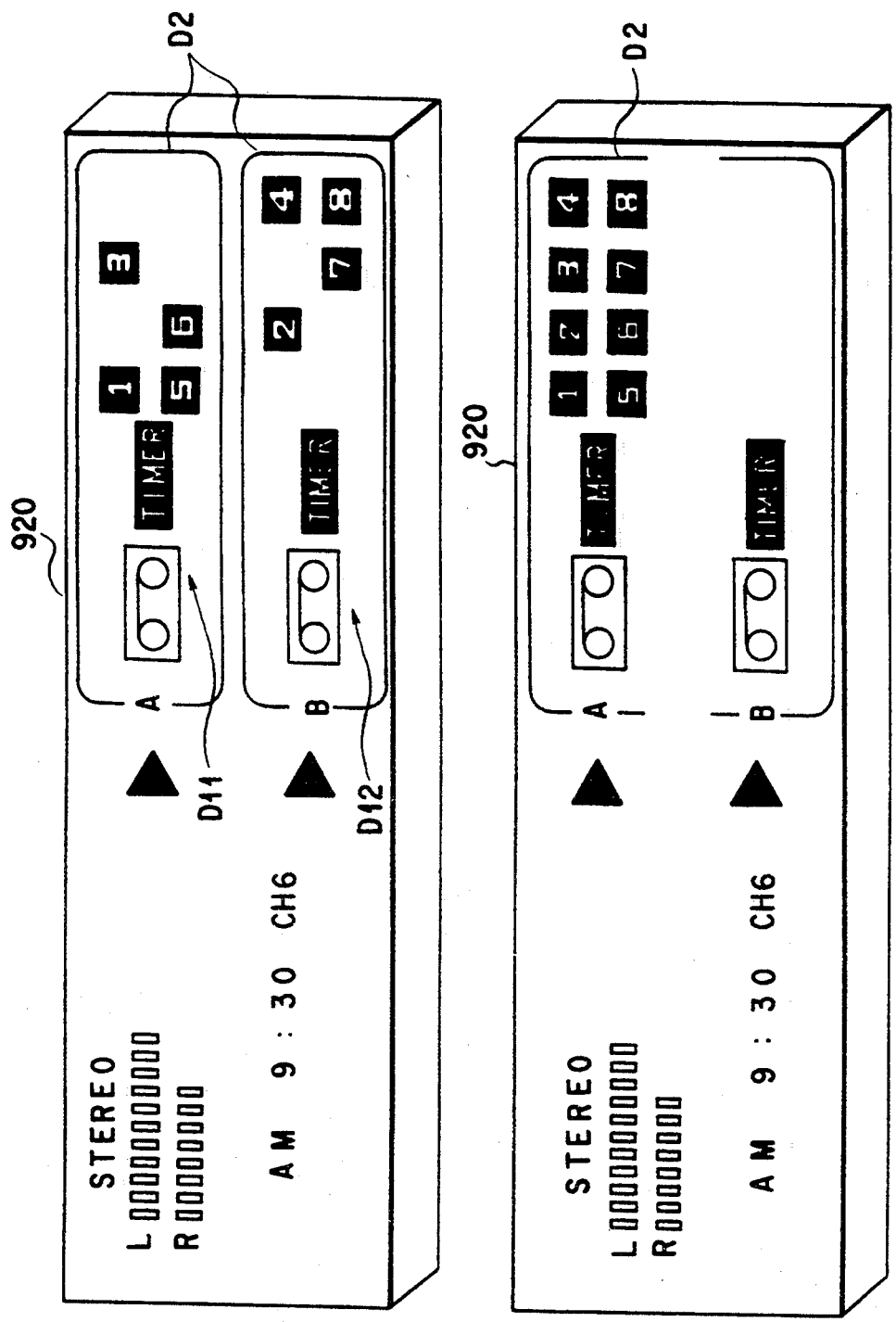
FIGS. 12A and 12B are explanatory views showing display examples of display units utilized in the timer operation management apparatus according to the present invention.

FIGS. 12A and 12B show another display mode of the timer reservation condition. FIG. 12A shows an independent designation state, and FIG. 12B shows a series designation state. A line frame display on a display section can be switched between a state wherein line frames individually surround marks of cassettes A and B (FIG. 12A), and a state wherein a line frame surrounds the entire display section (FIG. 12B).

In the above description, the recording operation is performed using the timer reservation function. Alternatively, it is easy to designate a play mode of an already recorded tape. When an information area for discriminating the recording or play mode is allocated on the timer information memory, and an operation of a recording/play designation switch is allowed to be accepted in step S55 in FIG. 10A, a combination of recording and play operations can be programmed.

Figure 13:
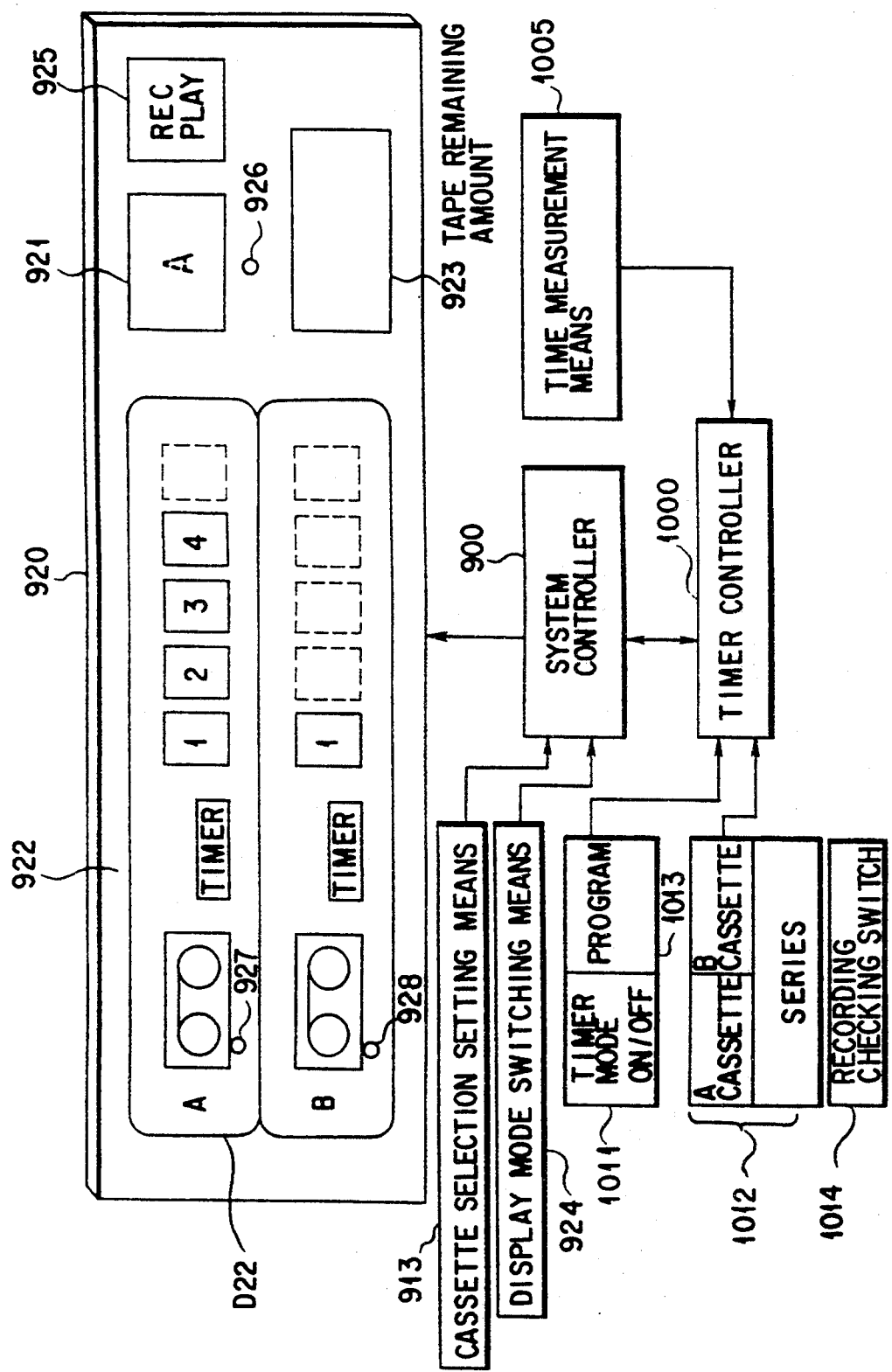
FIGS. 13 and 14 are explanatory views showing operation units and other display sections of timer operation management apparatuses according to still another embodiment of the present invention.
Figure 14:
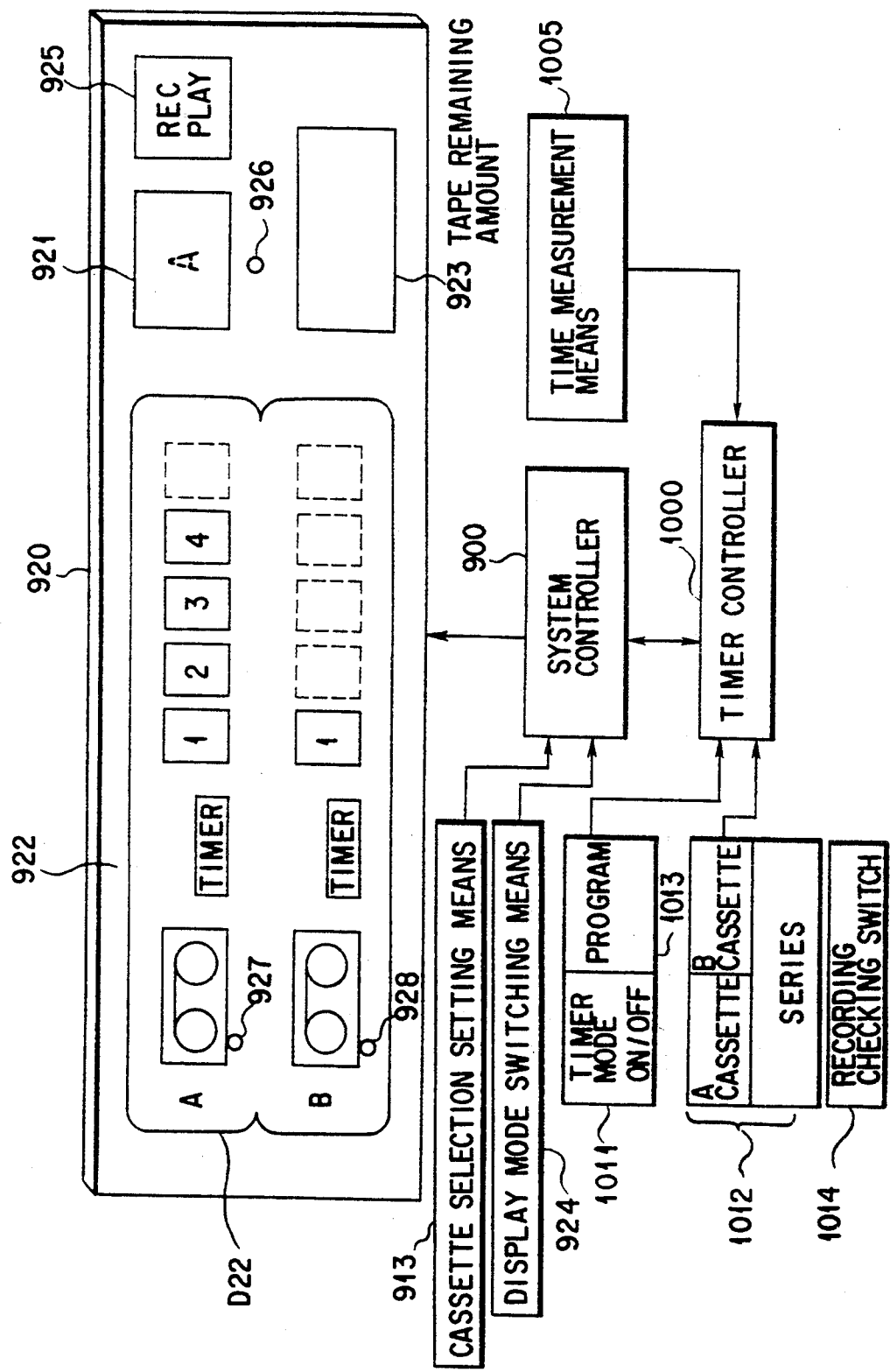

FIGS. 13 and 14 show still another embodiment of the present invention.

The same reference numerals in this embodiment denote portions corresponding to those in the previous embodiments. A display unit 920 of this embodiment is provided with an operating cassette display section 921, a selected cassette display section 922, a counter/-remaining amount display section 923, and an operation mode display section 925.

A display on a second display section D22 of the selected cassette display section 922 of the display unit 920 shown in FIG. 13 is made in a two-split pattern, and in FIG. 14, the display is made to surround the entire section D22. The display pattern shown in FIG. 13 means an independent play or recording mode, and the display pattern shown in FIG. 14 means a series play or recording mode. The selected cassette display section 922 includes cassette marks corresponding to cassettes A and B, and when one of these cassettes is selected, the corresponding mark is illuminated. Normally, displays are made on the second display section D22. When the recording or play mode is set, letters "Rec" or "Play" are displayed on the operation mode display section 924. When a timer reservation mode is selected, and a timer program is to be set, a portion printed with "timer" adjacent to a cassette mark corresponding to the selected cassette is turned on. The program reservation operation is performed in the same manner as in the above embodiments. The timer reservation operation can be performed regardless of an access cassette and a standby cassette. When a cassette displayed on the operating cassette display section 921 coincides with a cassette to be indicated on the selected cassette display section 922, a system controller 1000 is programmed to perform an alarm display on the operation mode display section 926. Furthermore, when a cassette, which is set in a recording protect mode, i.e., whose cassette lug is removed, is selected, and a recording operation is reserved, the alarm display is also made on the display section 926.

The counter/remaining amount display section 923 normally displays a counter/remaining amount of a cassette indicated on the operating cassette display section 921. When a display mode switching signal is input from a display mode switching means 924, and a designation signal is input from a cassette selection setting means 913, counter/remaining amount data corresponding to the cassette is read out from a cassette information storage means, and is displayed on the display section 923 for a predetermined period of time. The remaining amount display can be obtained regardless of an access cassette and a standby cassette.

The selected cassette display section 922 also has a display function used when the presence/absence of a cassette lug is checked. This function is easily attained by checking data in the cassette information storage means. When the cassette designation switch 1012 and a recording checking switch 1014 are depressed, an indicator 927 or 928 provided near the position of the lug of the corresponding cassette mark is turned on in green when recording is possible, or is turned on in red when recording is impossible. When only the cassette A is loaded in the VTR, only the cassette mark corresponding to the cassette A is illuminated brightly, and the other cassette mark is not illuminated.

The display column of a cassette selected by a cassette selection setting means 913 is entirely brightly illuminated, or partially or entirely flashes or changed in display color, thus allowing easy identification.

According to the above embodiment, the mount condition and the operation setting conditions of a plurality of cassettes can be displayed using a single display unit to allow easy visual understanding. Although the same applies to the above embodiments, display columns corresponding to a plurality of cassettes are provided to the selected cassette display section 922, thereby attaining easy identification of an independent designation state and a series designation state.

FIGS. 15A to 15E, FIGS. 16A to 16D, and FIGS. 17A to 17C show other embodiments of the display unit 920.

Figure 15D:
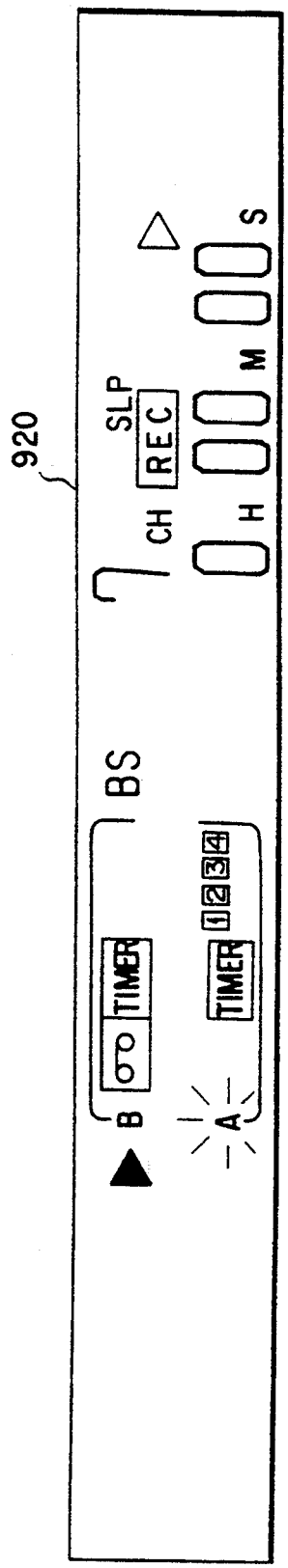
Figure 15E:
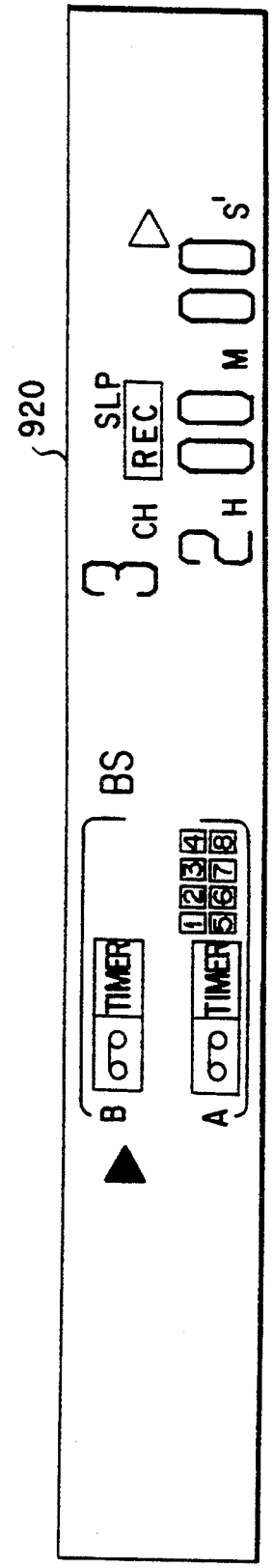

FIGS. 15A to 15E show display states in a series use mode. FIG. 15A shows a state wherein only a cassette A is loaded, and is mounted on a tape driving section. In FIG. 15A, numerals indicate a timepiece display. FIG. 15B shows a state wherein both cassettes A and B are loaded, and the cassette B is mounted on the tape driving section to be subjected to a recording operation. Normally, when a continuous operation is selected, the operation is automatically started from the cassette A, and at the end of the tape of the cassette A, the cassette A is automatically switched to the cassette B. FIG. 15B illustrates a state after the cassette A is switched to the cassette B. In FIG. 15B, a counter and a recording state are displayed, and a triangular mark indicating that the tape is traveling is displayed. FIG. 15C shows a state wherein the cassette B is mounted on the tape driving section, and is set in a timer standby mode. FIG. 15D shows a state wherein a timer recording operation is started from the state shown in FIG. 15C. Normally, the cassette A is automatically selected, and the recording operation is started. In this case, however, since the cassette A is not loaded, the recording operation is performed using the cassette B, and "A" indicating the cassette A flashes. FIG. 15E shows a state wherein the cassettes A and B are loaded, and a timer recording operation of the cassette B is being performed. More specifically, FIG. 15E shows a state after the tape of the cassette A ends, and the cassette A is switched to the cassette B.

FIGS. 16A to 17C show display states in an independent use mode.

Figures 16A, 16B:
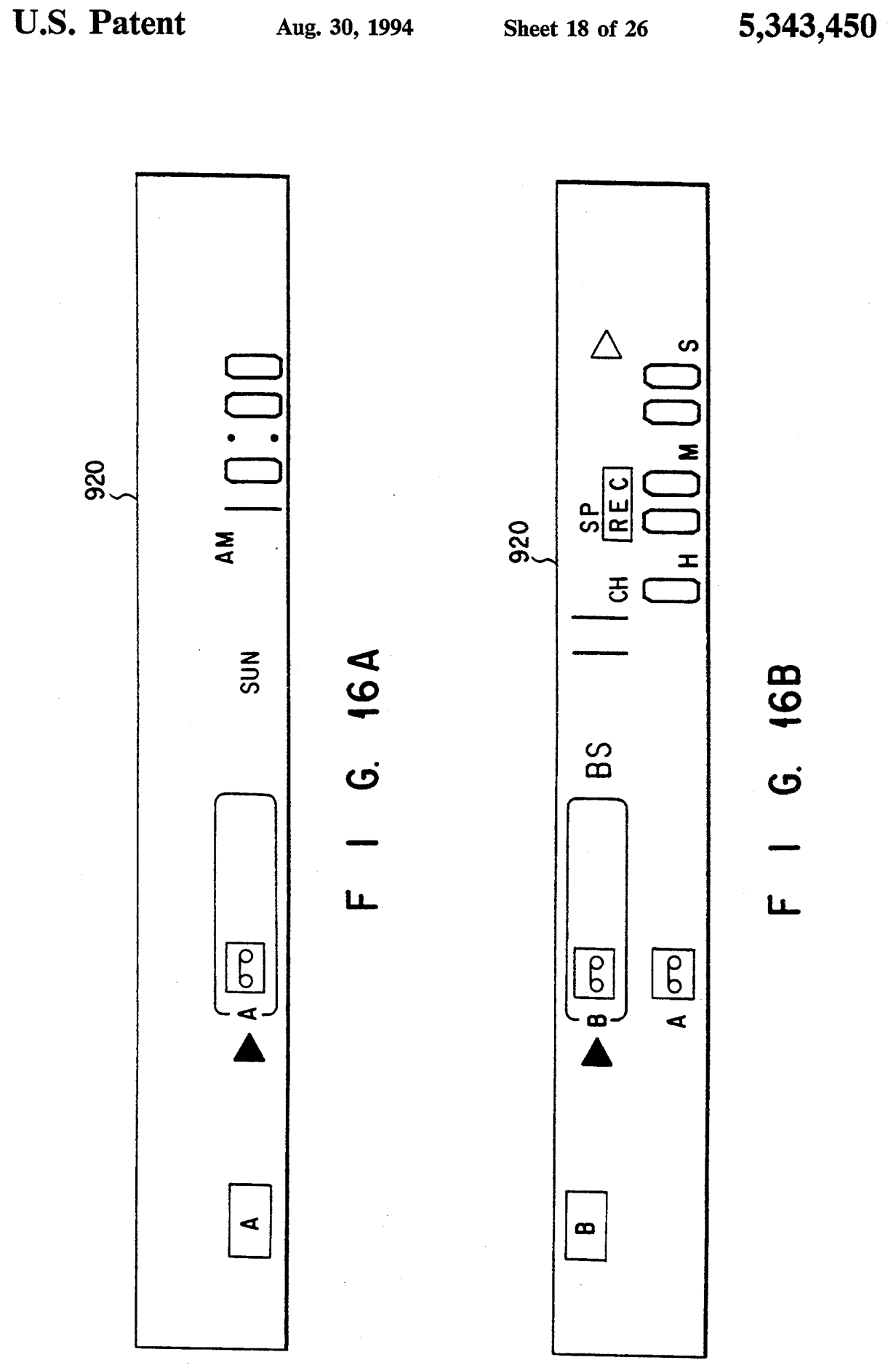
Figure 16C:
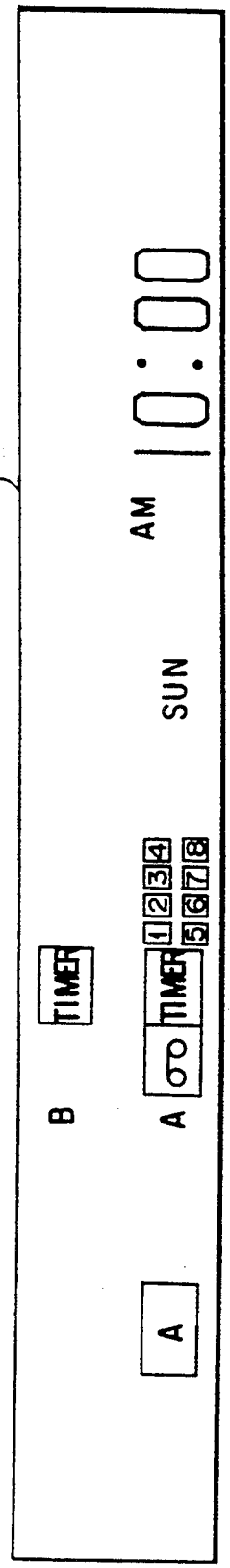
Figure 16D:
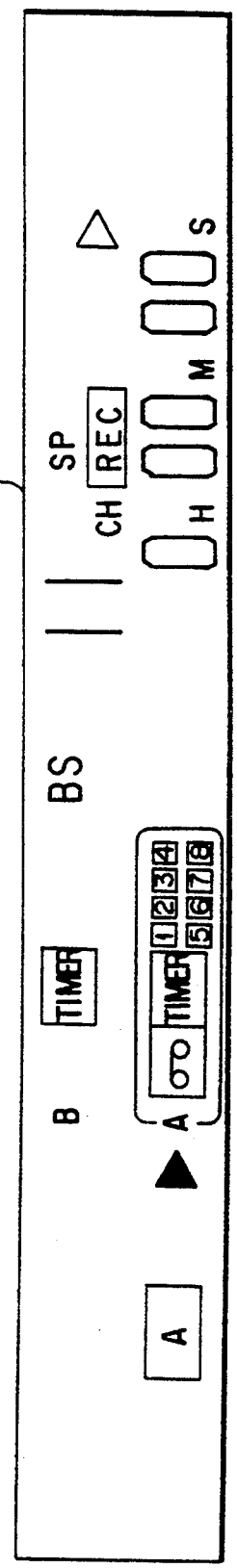

FIG. 16A shows a state wherein the cassette A is mounted on the tape driving section, and is selected. FIG. 16B shows a state wherein the cassettes A and B are loaded, and a recording operation is performed using the cassette B. FIG. 16C shows a state wherein the cassette A is mounted on the tape driving section, and a timer program for the cassette A is set in a standby state. FIG. 16D shows a state wherein a timer recording operation is started from the state shown in FIG. 16C. FIG. 17A shows a state wherein the cassette B is mounted on the tape driving section, and the cassette A is selected. FIG. 17B shows a state wherein the cassettes A and B are loaded, and a timer recording operation is performed using the cassette B. In FIG. 17B, numerals "1" to "8" indicate program numbers. FIG. 17B illustrates a state wherein programs "3", "5", and "8" are reserved for the cassette A, and programs "1", "2", "4", "6", and "7" are reserved for the cassette B. Since the program numbers are selectively assigned to the cassettes A and B, if the independent use mode is changed to the series use mode, the program numbers are left unchanged since the program numbers do not overlap each other, thus allowing reliable timer recording operations. FIG. 17C shows a state wherein a play operation is performed using the cassette A while the cassette B is set in a timer standby mode.

The structure of the VTR assembled with the above-mentioned management apparatus will be described below. In this case, a VTR which can load two cassettes in advance will be exemplified for the sake of easy understanding.

Figure 18C:
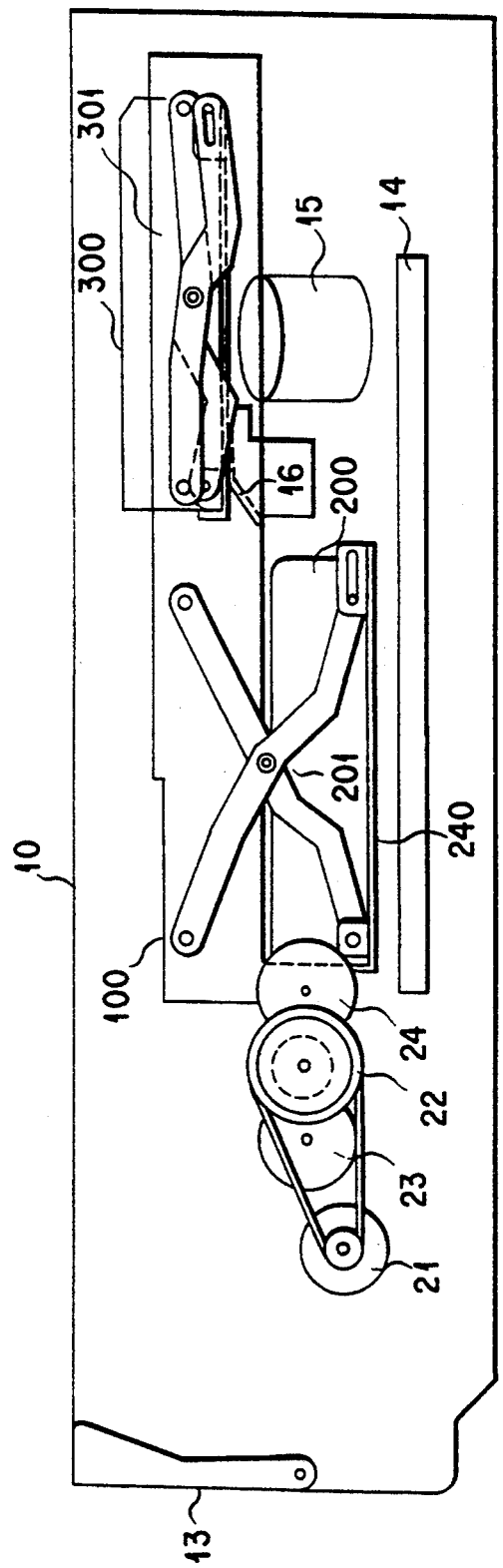

FIGS. 18A to 18C are explanatory views showing the basic structure of a cassette loading/unloading mechanism. Reference numeral 10 denotes a VTR housing. An opening 12 is formed in the front surface of the VTR housing 10. A tray unit 100 can be horizontally inserted or exposed from the interior of the housing 10 through the opening 12. Note that reference numeral 13 denotes a lid provided to the opening 12. The lid 13 is opened when the tray unit 100 is drawn from the housing 10, and is closed when it is inserted in the housing 10. Although not shown, the opening/closing operation is realized by a lid opening/closing mechanism interlocked with the tray unit 100.

In the housing 10, a motor 21 is arranged at a stationary position as a tray driving mechanism, and can rotate an intermediate gear 22. The intermediate gear 22 has a rotating shaft extending in a direction perpendicular to a back-and-forward moving direction of the tray unit 100, and can rotate driving gears 23 and 24 respectively rotatably provided to the front and rear sides of the gear 22. The driving gears 23 and 24 are meshed with a rack provided to the lower surface of the side portion of the tray unit 100, and can drive the tray unit 100 in the back-and-forth direction. The VTR includes a function of mounting a cassette at a predetermined position, and executing a tape loading operation. Reference numeral 14 denotes a main chassis, which is provided with reel shafts each engaging with a reel hub of a cassette, and various parts (not shown) necessary for the tape loading and tape driving operations. Reference numeral 15 denotes a rotary head drum, which is in rolling contact with a tape drawn from a cassette mounted at a predetermined mount position by the tape loading operation. FIG. 18A shows a state wherein the front driving gear 23 is meshed with the rack. FIG. 18B shows a state wherein both the front and rear driving gears 23 and 24 are meshed with the rack. FIG. 18C shows a state wherein the rear driving gear 24 is meshed with the rack.

The tray unit 100 has a tray frame having a frame shape when viewed from the upper surface. Rails outside the side plates of the tray frame are horizontally movably guided by rollers arranged on the inner side surfaces of the housing 10.

In this system, two cassettes, i.e., cassettes 200 and 300 can be respectively arranged on the front and rear regions of the upper surface of the tray unit 100 (FIG. 18A). Pantograph mechanisms 201 and 301 are respectively attached to the front and rear regions of the tray unit 100. The pantograph mechanisms 201 and 301 have the same mechanism, and can move cassette bottom support plates upward or downward by a link mechanism.

FIG. 18A shows a state wherein the cassettes 200 and 300 are respectively placed on the front and rear regions. The reason why the front end portions of the cassettes 200 and 300 are directed obliquely upward is that these cassettes are popped up by a pop-up mechanism provided to the tray unit 100 to facilitate a loading-/unloading operation of the cassettes. In addition, the tray unit 100 is designed, so that, in this state, the rear cassette 300 can be removed without largely drawing the tray unit 100 from the opening of the housing 10. More specifically, the front cassette 200 is entirely exposed, while only a portion (front end portion) of the rear cassette 300 is exposed from the opening. With this design, a distance required for drawing the tray unit 100 can be shortened, and the space factor in a surrounding area can be reduced in terms of handling.

FIG. 18B shows a state wherein the rear pantograph mechanism 301 mounts the cassette 300 to a cassette mount position below a tray passage position. FIG. 18C shows a state wherein the front pantograph mechanism 201 moves the cassette 200 downward, and mounts it at a predetermined cassette mount position. When the state shown in FIG. 18A is shifted to the state shown in FIG. 18B, the tray driving mechanism is operated to horizontally move the tray unit 100 toward the interior of the housing 10, and the tray unit 100 is stopped when it reaches a first detection position (rear cassette driving position). When the tray unit reaches this position, a pantograph driving mechanism (to be described later) is enabled to drive the pantograph mechanism 301, thereby moving the cassette 300 downward. When the state shown in FIG. 18B is shifted to the state shown in FIG. 18C, the pantograph driving mechanism drives the pantograph mechanism to lift up the cassette 300 at its downward position, thereby returning the cassette 300 to an original position on the tray unit 100. The tray driving mechanism moves the tray unit 100 to a deeper position, and the movement of the tray unit 100 is stopped when the pantograph mechanism 201 reaches a position above a cassette mount position, i.e., a second detection position (front cassette driving position). The pantograph driving mechanism drives the pantograph mechanism 201 in turn, thereby moving the cassette 200 downward to a predetermined position.

In the state shown in FIG. 18C, the pantograph mechanism 301 carrying the rear cassette 300 is located immediately above the rotary head drum 15. In this state, the pantograph mechanism 301 is guided in a direction to slightly float from the tray unit 100, so that the cassette 300 and the pantograph mechanism 301 do not collide against the rotary head drum 15. A member for lifting up the pantograph mechanism 301 is a guide member 16 projecting from the inner side surface of the housing 10. More specifically, when the tray unit 100 is moved from the state shown in FIG. 18A to a deeper position while the cassette 300 is located at its upward position, the bottom plate of the pantograph mechanism 301 rides on the inclined surface of the guide member 16. In this manner, the reason why the cassette 300, i.e., the pantograph mechanism is slightly lifted up at the standby position of the cassette 300 is that if the height of the housing 10 is decreased to realize a compact structure, the moving path of the tray unit 100 collides against the upper portion of the rotary head drum 15. In addition, this structure is adopted to suppress a temperature rise by attaining sufficient ventilation around the rotary head drum 15, and in consideration of safety of a cassette tape.

As can be seen from the comparison between the states shown in FIGS. 18A and 18C, the following design is achieved. FIG. 18A illustrates the fully drawn state of the tray unit 100, and FIG. 18C illustrates a state wherein the tray unit 100 is inserted up to the deepest position. The rack is formed at the edge of the lower surface of the tray unit 100, and is meshed with the gears 23 and 24, thereby driving the tray unit 100 in the back-and-forth direction. However, the gears 23 and 24 are arranged in a tray moving direction, so that only the gear 23 is meshed with the rack in the state shown in FIG. 18A, and only the gear 24 is meshed with the rack in the state shown in FIG. 18C. The two gears 23 and 24 are interlocked through the intermediate gear 22. Since the gears 23 and 24 are arranged in this manner, the total length of the tray unit 100 in the back-and-forth direction can be shortened. If the driving gears of the tray unit 100 are realized by one gear, the total length of the tray unit 100 becomes undesirably larger than that of this embodiment. This is because one gear must be meshed with the rack in both the states shown in FIGS. 18A and 18C.

Since the total length of the tray unit 100 can be shortened, the weight can be decreased to reduce a load on a driving device, and a projecting space of the tray unit 100 upon loading of cassettes can be narrowed. Thus, space factor can be reduced in a surrounding area. In other words, even when the tray unit 100 has a small total length, the moving stroke of the tray unit 100 can be increased.

Figure 19:
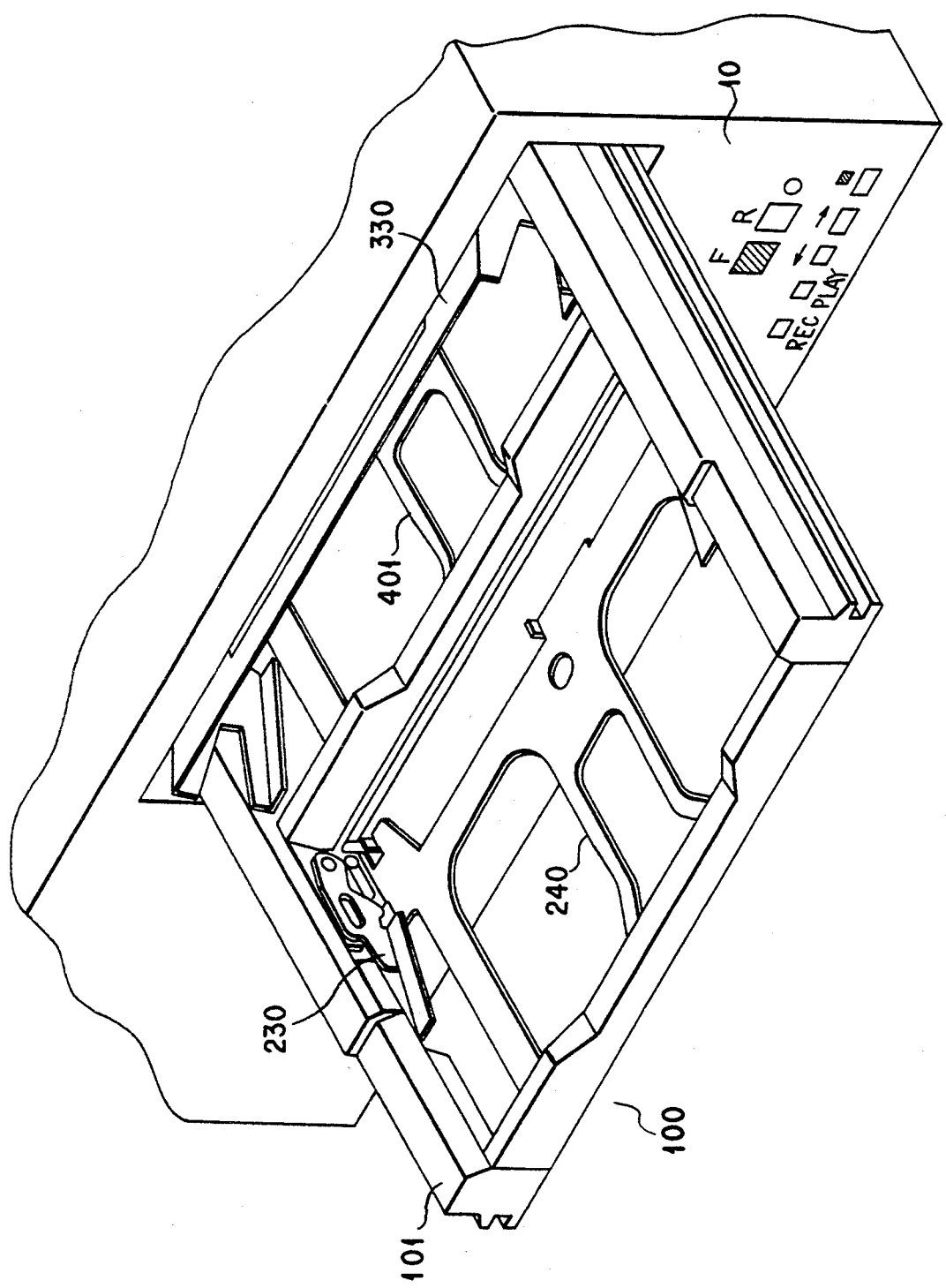
FIG. 19 is a perspective view showing a drawn state of a tray unit of the VTR.

FIG. 19 is a schematic perspective view showing a state wherein the tray unit 100 is fully drawn from the housing 10. As can be seen from FIG. 19, the front pivotal ends of pop-up members 230 and 330 are directed upward with respect to horizontal cassette bottom support plates 240 and 401.

Operation switches such as recording (Rec), play (Play), rewind, fast forward, stop switches, and the like are arranged on an operation unit of the VTR main body, and switches for designating front and rear cassette loading modes F and R are also arranged.

This system includes a safety lug detecting unit for detecting whether or not the safety lug of a cassette mounted on the tray unit 100 is removed.

Figure 20A:
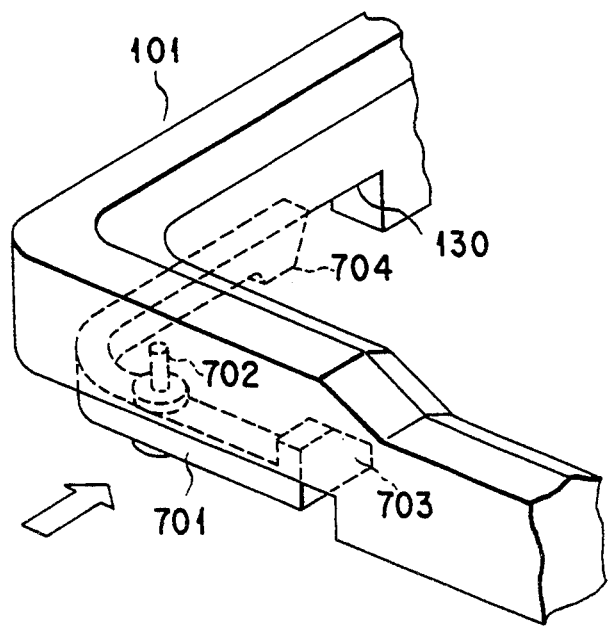
FIGS. 20A and 20B are explanatory views showing the arrangement of a safety lug detecting unit arranged in association with the tray unit.
Figure 20B:
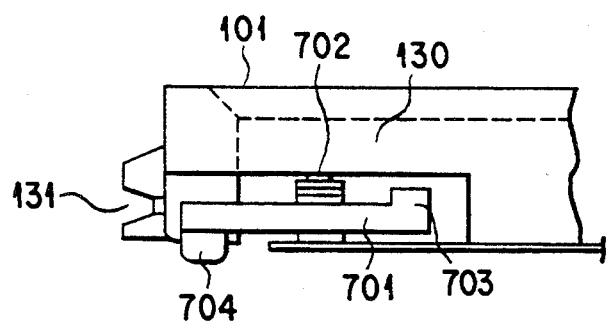

FIGS. 20A and 20B show a left rear corner of a frame 101 in detail. FIG. 20A is a perspective view, and FIG. 20B is a rear view. A notch 130 notched in an L shape is formed in the lower portion of the corner portion of the frame 101. An L-shaped lug detection lever 701 is arranged along the notch 130. The intermediate portion of the lug detection lever 701 is mounted on the thick surface of the frame through a shaft 702, and the lever 701 is pivotal about the shaft 702. The lever 701 is normally biased by a spring (not shown), so that a projection 703 at one end portion of the lever 701 projects inwardly from the frame. A downward projection 704 is formed at the other end portion of the lug detection lever 701. A groove 131 formed on the outer side surface of the frame 101 receives a roller fixed to the inner surface of the housing. The frame is movably guided by this roller in the back-and-forth direction.

FIGS. 21A and 21B show states wherein cassettes 200A and 200B are respectively mounted on the tray unit 100. In the case of the cassette 200A, the safety lug is removed, and in the case of the cassette 200B, the safety lug remains. As can be seen from the comparison between FIGS. 21A and 21B, the pivot angle of the lug detection lever 701 is varied depending on whether the lug is present. On the other hand, when the tray unit 100 is inserted in the housing, the lug detection lever 701 is moved together with the frame 101. A shutter mechanism 720 is arranged below the moving path of the lever 701 (FIG. 21C). In the shutter mechanism 720, a pivotal driving lever 722 is attached to a shaft 721 at a stationary position, and a projection 723, which can contact the projection 704 of the lug detection lever 703, is formed on one end of the driving lever 722. The projections 723 and 704 can contact each other only when the lug detection lever 701 is in the state shown in FIG. 21B (when the safety lug remains). When the lever 701 is in the state shown in FIG. 21A, these projections cannot contact each other. When the projection 704 approaches and is brought into contact with the projection 723, the driving lever 722 is pivoted in a direction of an arrow in FIG. 21C about the shaft 721. When a non-contact state is attained after the projection 723 passes the projection 704, the lever 722 is returned to its original position. In this operation, the driving lever 722 drives a shutter plate 725 through an intermediate lever 724, and temporarily shields light incident on a tape end detection element 730. The shutter plate 725 is pivotally supported on a shaft 726 at a stationary position, and its pivotal end portion is coupled to the intermediate lever 724.

As described above, according to this safety lug detecting unit, when a cassette is mounted on the tray unit, and the tray unit is inserted in the housing, the presence/absence of the lug of the cassette can be determined based on the presence/absence of an output from the tape end detection element 730. The tape end detection element 730 is used in tape end detection, and with this device, multi-functions can be realized.

In FIGS. 20A to 21C, the lug detection lever 701 is provided to the front region of the frame 101. The same lug detection lever is also provided to the rear region, so that the safety lug of a cassette mounted on the rear region can be detected. Since the front and rear lug detection levers are designed to pass the arranging position of the driving lever 722, the function of the tape end detecting unit is commonly used. Therefore, when two cassettes are recordable, a detection signal is obtained twice.

The above arrangement exemplifies a safety lug detecting unit. The same device is symmetrically arranged at the right side of the frame, and a cassette detection lever, a shutter mechanism, and a photosensor are arranged, thus obtaining a cassette detecting unit.

Figure 22:
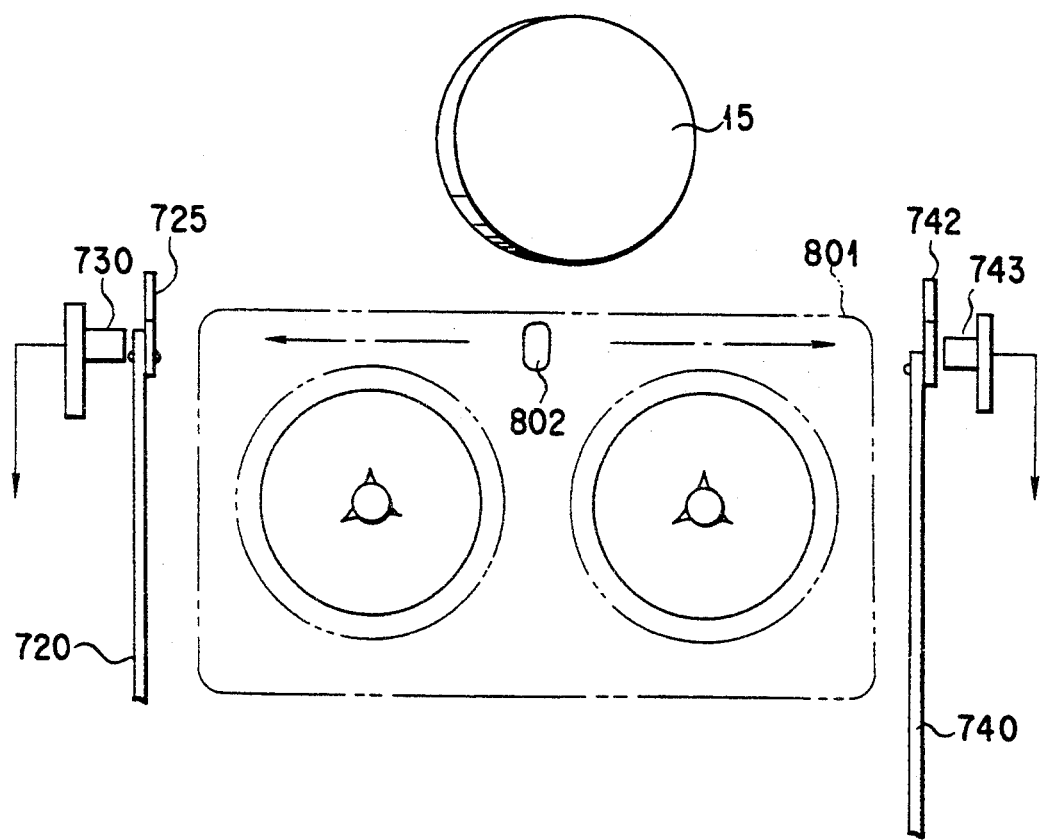
FIG. 22 is an explanatory view showing arranging positions of sensor units of the safety lug detecting unit and a cassette detecting unit.

FIG. 22 shows the position of the tape end detecting unit, and a sensor for obtaining a detection signal. Reference numeral 801 denotes a predetermined mount position in the vicinity of the rotary head drum 15. At this position, a cassette is mounted by the pantograph mechanism. In this mount state, a tape driving operation is enabled. When the cassette is mounted, a light source unit 802 constituting the tape end detecting unit enters a hole formed at the center in the right-and-left direction of the bottom surface of the cassette. Light emitted from the light source unit 802 is horizontally radiated in the right-and-left direction. At the left side, the tape end detection element 730 using a light-receiving element is arranged in an optical path, and at the right side, a second tape leading end detection element 743 is arranged. The shutter plate 725 and a shutter plate 742 of the shutter mechanism 720 are arranged in front of the two detection elements. The outputs from the detection elements are input to the system controller.

What is claimed is:

1. A timer operation management apparatus comprising:
    cassette information storage means for storing cassette information, said cassette information including presence/absence information corresponding to a plurality of cassettes; and
    timer information input/storage means capable of inputting and storing timer information for cassette selection, said timer information including cassette designation information corresponding to a given cassette to be subjected to timer reservation, timing information corresponding to said given cassette, and operation content information indicating a recording or replay mode for operation corresponding to said given cassette,
    wherein said cassette designation information includes individual designation information for designating individual cassettes, and all designation information for designating cassettes based on one of a group consisting of said cassette information stored in said cassette information storage means and said plurality of cassettes in a predetermined sequence, whereby said predetermined sequence of designated cassettes may be loaded before recording or playback are effected.

2. A timer operation management apparatus comprising:
    cassette information storage means for storing cassette information, said cassette information including presence/absence information corresponding to a plurality of cassettes; and
    timer information input/storage means for inputting and storing timer recording information, said timer recording information including cassette designation information corresponding to a given cassette to be subjected to a timer recording reservation operation, and timing information including start and end timings for a timer recording operation corresponding to said given cassette,
    wherein said cassette designation information includes individual designation information for designating individual cassettes, and all designation information for designating cassettes based on one of a group consisting of said cassette information stored in said cassette information storage means and said plurality of cassettes in a predetermined sequence, whereby said predetermined sequence of designated cassettes may be loaded before recording or playback are effected.

3. A timer operation management apparatus comprising:
    cassette convey control means which selectively conveys at least one of a plurality of cassettes to, and mounts said at least one cassette on a tape driving position, and which feeds said at least one mounted cassette outside said apparatus;
    use cassette determination/control means for determining a use cassette by discriminating input information, and for controlling said cassette convey control means so that said determined use cassette is mounted at said tape driving position by said cassette convey control means;
    timer cassette/operation time setting means for outputting timer cassette information indicating a given cassette to be subjected to a timer operation of said plurality of cassettes, and for outputting information indicating a timing for said timer recording operation of said given cassette, where said timer operation includes a timer recording operation;
    timer information storage means for storing timing information indicating a timer recording operation timing corresponding to said given cassette;
    clock means for generating a time information output; and
    timer information control means for comparing said time information output from said clock means with said timing information stored in said timer information storage means, and for, when the two pieces of information coincide with each other, supplying said coincident timer cassette information to said use cassette determination/control means, thereby forcibly overriding other operations to perform said recording operation.

4. A timer operation management apparatus comprising:
    cassette convey control means which selectively conveys and mounts cassettes on a plurality of regions to a tape driving position, and which feeds said mounted cassettes outside said apparatus;
    cassette information detection and storage means for detecting and then storing cassette information including presence/absence information corresponding to said cassettes on each of said regions of said cassette convey control means without mounting said cassettes on said plurality of regions within said tape driving position;
    timer cassette reservation means for reserving a cassette which is to be subjected to a timer operation from said cassettes on said plurality of regions, and for outputting designation information for said reserved cassette;
    timer operation time setting means for outputting timing information indicating a timer operation timing of said reserved cassette;

timer information storage means for storing as a set of information said information output from said timer cassette reservation means and said timing information from said timer operation time setting means; and alarm means for, when cassette designation information is output from said timer cassette reservation means, searching said cassette presence/absence information in said cassette information detection and storage means and for generating an alarm when it is determined from that information that said reserved cassette is absent.

5. A timer operation management apparatus comprising:

cassette convey control means which selectively conveys and mounts cassettes on a plurality of regions to a tape driving position, and which feeds said mounted cassettes outside said apparatus;

cassette information detection and storage means for detecting and then storing cassette information including presence/absence information corresponding to said cassettes and presence/absence information corresponding to a safety lug for each cassette on each of said regions of said cassette convey control means without mounting said cassettes on said plurality of regions within said tape driving position;

timer cassette reservation means for reserving a cassette which is to be subjected to a timer operation from said cassettes on said plurality of regions, and for outputting designation information for said reserved cassette;

timer operation time setting means for outputting timing information indicating a timer operation timing of said reserved cassette;

timer information storage means for storing, as a set of information, said information output from said timer cassette reservation means and said timing information from said timer operation time setting means; and alarm means for, when cassette designation information is output from said timer cassette reservation means, searching said presence/absence information corresponding to said safety lug in said cassette information detection and storage means to check if the corresponding cassette is recordable, and for generating an alarm when it is determined that the corresponding cassette is not recordable.

6. A timer operation management apparatus comprising:

cassette convey control means which selectively conveys and mounts cassettes on a plurality of regions to a tape driving position, and which feeds said mounted cassettes outside said apparatus;

cassette information detection and storage means for detecting and then storing cassette information including presence/absence information corresponding to said cassettes on each of said regions of said cassette convey control means without mounting said cassettes on said plurality of regions within said tape driving position;

timer cassette reservation means for reserving a cassette which is to be subjected to a timer operation from said cassettes on said plurality of regions, and for outputting designation information for said reserved cassette;

timer operation time setting means for outputting timing information indicating a timer operation timing of said reserved cassette;

timer information storage means for storing as a set of information said information output from said timer cassette reservation means and said timing information from said timer operation time setting means; and alarm means for generating an alarm when said cassette convey control means feeds a cassette outside said apparatus and designation information corresponding to said removed cassette is stored in said timer information storage means.

7. A timer operation management apparatus comprising:

a cassette information storage unit for checking the presence/absence of a plurality of cassettes, and the presence/absence of a safety lug of each cassette, and storing cassette information including the presence/absence information;

timer information input/storage means capable of inputting and storing timer information including timer cassette designation information and timer timing information, which are required for a timer recording operation;

judgment means for judging based on the cassette information at the beginning of execution after a reservation operation whether or not timer execution of a designated cassette is possible, and checking a cassette that can be subjected to timer execution; and control means for, when the judgment result from said judgment means indicates that the timer execution is impossible, conveying and mounting another cassette, for which it is determined by said judgment means that the timer execution is possible.

8. A timer operation management apparatus comprising:

a timer operation execution unit for timer-controlling means for selecting one of a plurality of cassettes, means for mounting the selected cassette on a tape driving section, and drive means for controlling said tape driving section so as to cause a tape to travel;

judgment means for, when said timer operation execution unit starts timer execution, judging whether or not a cassette to be subjected to a timer operation has already been mounted on said tape driving section; and means for switching and setting a timer execution start timing of said timer operation execution unit depending on whether the judgment result from said judgment means indicates that the corresponding cassette has already been mounted or is not mounted yet.

9. A timer operation management apparatus comprising:

cassette convey control means for mounting a plurality of cassettes, for selectively conveying and mounting said cassettes on a tape driving section, and for feeding said mounted cassettes outside said apparatus;

cassette selection means for outputting designation data for selecting and designating one of said plurality of cassettes to be conveyed by said cassette convey control means;

operation mode input means for outputting management data including cassette subsidiary information, where said cassette subsidiary information includes a timer setting instruction and remaining amount display data corresponding to one of a group consisting of said designated cassette and a tape driving instruction; and display/control means including at least an operating cassette display section for identifying a cassette mounted on said tape driving section, and a selected cassette display section for identifying a cassette selected by said cassette selection means.

10. A cassette condition display apparatus comprising:

cassette convey control means for mounting a plurality of cassettes, for selectively conveying and mounting said cassettes on a tape driving section, and for feeding said mounted cassettes outside said apparatus;

cassette selection means for outputting designation data for selecting and designating one of said plurality of cassettes to be conveyed by said cassette convey control means;

operation mode input means for outputting management data including cassette subsidiary information, where said cassette subsidiary information includes a timer setting instruction and remaining amount display data corresponding to one of a group consisting of said designated cassette and a tape driving instruction; and an operating cassette display section for identifying a cassette mounted on said tape driving section;

a selected cassette display section for identifying a cassette selected by said cassette selection means; and a condition display section for performing a condition display of selected cassette subsidiary information items corresponding to information displayed within said selected cassette display section when said management data input from said operation mode input means is said cassette subsidiary information requiring no tape driving operation.

11. A cassette condition display apparatus comprising:

cassette convey means, which can mount a plurality of cassettes, can selectively convey and mount the cassettes on a tape driving section, and can feed the mounted cassette outside equipment;

counter/remaining amount measurement means for, when each of the cassettes is selectively mounted on said tape driving section by said cassette convey means, obtaining tape counter or remaining amount information of the cassette;

cassette information storage means for storing the counter/remaining amount information in units of cassettes obtained from said counter/remaining amount measurement means;

display means for displaying the counter/remaining amount information;

cassette selection means for outputting designation data for selecting and designating one of the cassettes;

display control means for, in a normal state, reading out the counter/remaining amount information of an access cassette mounted on said tape driving section from said cassette information storage means, and supplying the readout information to said display means, and for, when a display mode switching signal is input from display mode switching means, and the designation data from said cassette selection means is input, reading out the counter/remaining amount information of a standby cassette corresponding to the designation data from said cassette information storage means, and supplying the readout information to said display means; and use cassette determination/control means for, when the designation data from said cassette selection means is input, and the display mode switching signal is cleared, controlling said cassette convey means, so that a cassette corresponding to the input designation data is mounted on said tape driving section.

12. A timer operation management apparatus comprising:

cassette convey control means for mounting a plurality of cassettes, for selectively conveying and mounting said cassettes on a tape driving section, and for feeding said mounted cassettes outside said apparatus;

cassette designation means capable of performing individual and series designation of said cassettes to be mounted by said cassette convey control means and subjected to operations including recording and play operations; and display means for performing a first display of said cassettes on independent positions when said cassette designation means performs individual designation of said cassettes, and for performing a second of series designation and individual designation when said cassette designation means performs series designation, wherein said second display distinguishes between a case of series designation and a case of individual cassette designation.

13. A cassette condition display apparatus comprising:

timer designation means for setting a timer reservation mode for inputting a recording start time and end time;

cassette designation means for performing individual and series designation of cassettes to be subjected to timer reservation while said timer reservation mode is set by said timer designation means; and display means for performing a first display of said cassettes at independent positions when said cassette designation means performs individual cassette designation, wherein said first display includes display of corresponding timer reservation conditions at the respective independent positions, and for performing a second display of series designation and individual designation when said cassette designation means performs series designation, wherein said second display includes display of a timer reservation condition regardless of said independent positions, and wherein said second display distinguishes between a case of series designation and a case of individual cassette designation.

14. A cassette condition display apparatus comprising:

timer designation means for setting a timer reservation mode for inputting a plurality of timer programs, each timer program including a recording start time and end time;

cassette designation means capable of designating cassettes to be subjected to timer reservation in units of programs, or designating a series of cassettes while said timer reservation mode is set by said timer designation means; and display means for performing an identification display of said cassettes at independent positions including display of corresponding timer reservation numbers at said respective independent positions when said cassette designation means performs individual cassette designation, and for simultaneously displaying said number of times of timer reservation regardless of said independent positions when said cassette designation means performs series designation.

15. A timer operation management apparatus comprising:

timer information input/storage means, which can input and store timer information in correspondence with a plurality of cassettes;

priority order setting/storage means for setting and storing a priority order of the cassettes;

timer operation execution means for executing a timer operation on the basis of the timer information;

timer standby mode setting means for outputting a timer standby mode setting signal for setting said timer operation execution means in a timer operation execution enable state;

timer standby mode canceling means, which can output, in a mode corresponding to the priority order of the cassettes, a timer standby canceling signal for canceling the execution enable state, and setting said timer operation execution means in a timer operation execution disable state; and cancel control means for controlling the timer canceling operation to cancel the timer operation execution enable state in response to the timer standby canceling signal corresponding to the priority order of the cassettes, and not to cancel the timer operation execution enable state in response to the timer standby canceling signal in a mode which does not correspond to the priority order.

16. A timer operation management apparatus comprising:

timer information input/storage means, which can input and store a plurality of pieces of timer information;

priority order setting/storage means for setting and storing a priority order of the plurality of pieces of timer information;

timer operation execution means for executing a timer operation on the basis of the timer information;

timer standby mode setting means for outputting a timer standby mode setting signal for setting said timer operation execution means in a timer operation execution enable state;

timer standby mode canceling means, which can output, in a mode corresponding to the priority order of the timer information, a timer standby canceling signal for canceling the execution enable state, and setting said timer operation execution means in a timer operation execution disable state; and cancel control means for controlling the timer canceling operation to cancel the timer operation execution enable state in response to the timer standby canceling signal corresponding to the priority order of the timer information, and not to cancel the timer operation execution enable state in response to the timer standby canceling signal in a mode which does not correspond to the priority order.

17. A timer operation management apparatus comprising:

cassette convey control means, which can selectively convey a plurality of cassettes to a tape driving position;

timer information input/storage means, which can input and store timer information including time information in correspondence with the plurality of cassettes;

timer operation execution means for executing a timer operation on the basis of the timer information;

timer standby mode setting means for outputting a timer standby mode setting signal for setting said timer operation execution means in a timer operation execution enable state;

operation mode input/system control means for conveying the cassette to the tape driving position to allow a recording or play operation in the timer standby mode; and timer control means for comparing time information input from time measurement means with the time information stored in said timer information input/storage means, and for, when the two pieces of information coincide with each other, controlling said operation mode input/system control means to forcibly execute a timer recording operation on the basis of the corresponding timer information.

18. A timer operation management apparatus comprising:

cassette convey control means, provided with a plurality of regions for conveying a plurality of cassettes to be mounted on said plurality of regions, for selectively loading a use cassette on a tape driving position, and for feeding said loaded use cassette outside said apparatus;

cassette information storage means for storing cassette information, said cassette information including presence/absence information corresponding to said plurality of cassettes, presence/absence information corresponding to a safety lug for each cassette, and tape remaining amount information corresponding to each cassette;

timer information input/storage means for inputting and storing a plurality of pieces of timer program information, said timer program information consisting at least of recording start/end time information; and use cassette determination/control means for determining a use cassette based on said cassette information from said cassette information storage means and said timer information from said timer information input/storage means, and for controlling said cassette convey control means so that said determined use cassette is loaded on said tape driving position.

19. A timer operation management apparatus comprising:

cassette convey control means, provided with a plurality of regions for conveying a plurality of cassettes to be mounted on said plurality of regions for selectively loading a use cassette on a tape driving position, and for feeding said loaded use cassette outside said apparatus;

cassette information storage means for storing cassette information, said cassette information including presence/absence information corresponding to said plurality of cassettes, presence/absence information corresponding to a safety lug for each cassette, and tape remaining amount information corresponding to each cassette;

timer information input/storage means for inputting and storing a plurality of pieces of timer information, said plurality of pieces of timer information including timer recording information and cassette information, said timer recording information consisting at least of recording start/end time information, said cassette information specifying selection from said individual cassette information items and common cassette information, said individual cassette information designating information regarding cassettes corresponding to said timer recording information, said common cassette information designating information regarding said plurality of cassettes corresponding to said timer recording information; and use cassette determination/control means for determining a use cassette based on said cassette information and said timer information, and for controlling said cassette convey control means, thereby loading said determining use cassette on said tape driving position.

20. A timer operation management apparatus comprising:

timer information input/storage means for inputting and storing a plurality of pieces of timer information, said plurality of pieces of timer information each consisting of information regarding a cassette to be timer-recorded and timer-recording time information, where said cassette to be timer-recorded is selected from a plurality of cassettes;

timer information selection means for selecting timer information regarding said cassette to be timer-recorded, where said selection is made from said plurality of pieces of timer information stored by said timer information input/storage means; and timer recording execution means for executing timer-recording on said cassette based on said selected timer information.

21. A timer operation management apparatus comprising:

use cassette selection means for selecting a plurality of cassettes in a predetermined sequence;

timer information storage means for storing a plurality of pieces of timer information each including recording start/end time; and timer recording execution means for executing timer-recording on said plurality of cassettes based on said plurality of pieces of timer information, and on said predetermined sequence which is set by said use cassette selection means.

22. A timer operation management apparatus comprising:

cassette information storage means for storing cassette information, said cassette information including presence/absence information corresponding to a plurality of cassettes, presence/absence information corresponding to a safety lug for each cassette, and tape remaining amount information corresponding to each cassette;

timer information storage means for storing a plurality of pieces of timer information, said plurality of pieces of timer information each including recording start/end time; and timer recording execution means for determining a use cassette based on said plurality of pieces of timer information and said cassette information, and then for executing timer-recording on said plurality of cassettes based on said use cassette.

* * * * *